(12) United States Patent
Rafique et al.

(10) Patent No.: US 11,533,094 B2
(45) Date of Patent: Dec. 20, 2022

(54) SYSTEMS AND METHODS FOR PROVIDING FORCED FULL ORTHOGONALITY FOR BEAMS IN A MU/MIMO RADIO SYSTEM

(71) Applicant: Telefonaktiebolaget LM Ericsson (publ), Stockholm (SE)

(72) Inventors: Raihan Rafique, Lund (SE); Lars Lennartsson, Sjöbo (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 17/288,592

(22) PCT Filed: Oct. 26, 2018

(86) PCT No.: PCT/EP2018/079450
§ 371 (c)(1),
(2) Date: Apr. 26, 2021

(87) PCT Pub. No.: WO2020/083510
PCT Pub. Date: Apr. 30, 2020

(65) Prior Publication Data
US 2021/0344395 A1 Nov. 4, 2021

(51) Int. Cl.
*H04L 1/02* (2006.01)
*H04B 7/06* (2006.01)
*H04B 7/0452* (2017.01)

(52) U.S. Cl.
CPC ......... *H04B 7/0617* (2013.01); *H04B 7/0452* (2013.01); *H04B 7/0632* (2013.01); *H04B 7/0634* (2013.01)

(58) Field of Classification Search
CPC . H04L 1/0618; H04L 1/06; H04L 1/00; H04L 27/362; H04W 26/18; H04W 16/28;
(Continued)

(56) References Cited

U.S. PATENT DOCUMENTS 3,717,814 A * 2/1973 Gans .................... H04B 7/0626
455/504
4,225,870 A 9/1980 Marner et al.
(Continued)

FOREIGN PATENT DOCUMENTS

KR 20130102757 A 9/2013
KR 20170082263 A 7/2017
(Continued)

OTHER PUBLICATIONS

Abu-Al-Nadi, D.I. et al., "Synthesis of Linear Array and Null Steering with minimized Side-Lobe Level Using Particle Swarm Optimization," Proceedings of the Fourth European Conference on Antennas and Propagation, Apr. 12-16, 2010, pp. 1-4.
(Continued)

*Primary Examiner* — Khai Tran
(74) *Attorney, Agent, or Firm* — Withrow & Terranova, PLLC

(57) ABSTRACT

Systems and methods are disclosed herein for providing full orthogonality between simultaneously used beams, e.g., in a Multi-User Multiple-Input-Multiple-Output (MU-MIMO) radio system. In some embodiments, a radio system comprises an antenna system and a processing unit. The processing unit is adapted to determine an initial set of null locations for a particular beam based on an initial set of beam weighting factors for the particular beam, and change one or more of the initial null locations based on one or more other beams to be used simultaneously with the particular beam, thereby providing a new set of null locations for the particular beam. The processing unit is further adapted to compute a new set of beam weighting factors for the particular beam based on the new set of null locations, and utilize the new set of beam weighting factors to transmit or receive on the particular beam.

16 Claims, 14 Drawing Sheets

(58) Field of Classification Search
CPC ............. H04W 72/0453; H04B 7/0617; H04B 1/0452
USPC ................................ 375/267, 130, 260, 262
See application file for complete search history.

(56) References Cited

U.S. PATENT DOCUMENTS

| | | |
|---|---|---|
| 7,885,364 B2 | 2/2011 | Ito |
| 2013/0163554 A1 | 6/2013 | Morozov et al. |
| 2015/0372726 A1 | 12/2015 | Cheong et al. |
| 2017/0331533 A1 | 11/2017 | Strong |
| 2020/0280128 A1* | 9/2020 | Rafique .................. H01Q 3/267 |

FOREIGN PATENT DOCUMENTS

| | | |
|---|---|---|
| WO | 2015/135489 A1 | 9/2015 |
| WO | 2016/141954 A1 | 9/2016 |
| WO | 2019/052655 A1 | 3/2019 |

OTHER PUBLICATIONS

Mouhamadou, M. et al., "Smart Antenna Array Patterns Synthesis: Null Steering and Multi-User Beamforming by Phase Control," Progress in Electromagnetics Research, PIER 60, 2006, pp. 95-106.
International Search Report and Written Opinion for International Patent Application No. PCT/EP2018/079450, dated May 29, 2019, 11 pages.

* cited by examiner

FIG. 4

SYSTEMS AND METHODS FOR PROVIDING FORCED FULL ORTHOGONALITY FOR BEAMS IN A MU/MIMO RADIO SYSTEM

This application is a 35 U.S.C. § 371 national phase filing of International Application No. PCT/EP2018/079450, filed Oct. 26, 2018, the disclosure of which is incorporated herein by reference in its entirety.

TECHNICAL FIELD

The present disclosure relates to a Multi-User Multiple-Input-Multiple-Output (MU-MIMO) radio system and, in particular, to a system and method for providing forced full orthogonality for beams in a MU-MIMO radio system.

BACKGROUND

Multi-User Multiple-Input-Multiple-Output (MU-MIMO) is a technology utilized in wireless communication systems such as, e.g., Third Generation Partnership Project (3GPP) Long Term Evolution (LTE) and Fifth Generation (5G) New Radio (NR) as well as IEEE 802.11 (commonly known as "WiFi"), to enable communication with multiple wireless devices simultaneously using beamforming. In a MU-MIMO radio system, analog, digital, or hybrid beam forming is used to generate multiple transmit or receive beams. These beams are used to communicate with multiple wireless devices in the spatial domain using the same antenna array and in the same frequency and time resources.

With respect to analog and digital beamforming, FIG. 5 illustrates an example of analog beamforming in which different physical subarrays are utilized to generate beams. FIG. 6 illustrates an example of digital beamforming in which the AAS is used to generate different beams using different virtual antenna subarrays.

In the spatial domain, the transmit or receive beams, which are generally referred to herein as "spatial multiplexing beams" or simply "beams", are orthogonal to each other. However, using ordinary beamforming techniques with uniform phase variation, the side lobe of one beam can overlap with the main lobe of another beam. As a result, full orthogonality among beam is not provided. Thus, the interface from one beam to another could be very high. In order to mitigate this type of interference, a tapering function with a window function is sometimes used to suppress the side lobe.

One particular solution for mitigating the aforementioned interference between beams is presented in International Patent Application Publication No. WO 2016/141954 A1 (hereinafter referred to as "the '954 Application"). The '954 Application teaches a solution in which multiple beam weighting factors (i.e., multiple sets of beamforming weights) are stored for a particular beam. Each of these beam weighting factors provides a beam pattern with the main lobe at the desired beam direction and side lobe levels lower than one or more thresholds in other directions that correspond to main lobe directions of a limited number of other beams. Then, when, e.g., two beams are scheduled simultaneously, one of the beam weighting factors for the first beam is selected based on the respective side lobe level in the direction of the main lobe of the second beam. Likewise, one of the beam weighting factors for the second beam is selected based on the respective side lobe level in the direction of the main lobe of the first beam. In this manner, interference between the two beams is mitigated. However, the solution presented in the '954 Application does not ensure null of all beam will end up in the beam direction for all time and needs proper scheduling. Additionally, in uplink when different signals are received from different wireless devices, static beam weighting factors do not help to improve Signal to Interference plus Noise Ratio (SINR).

Therefore, there is a need for a complete solution that will ensure that, for each beam of a randomly selected set of beams to be simultaneously used, nulls of the beam are located at the main lobe directions of all of the other beams in the set, where the set of beams to be simultaneously used is random.

SUMMARY

Systems and methods are disclosed herein for providing full orthogonality between simultaneously used beams, e.g., in a Multi-User Multiple-Input-Multiple-Output (MU-MIMO) radio system. In some embodiments, a radio system comprises an antenna system and a processing unit. The antenna system comprises a plurality of antenna elements. The antenna system further comprises a plurality of transmit branches coupled to the plurality of antenna elements, respectively, and/or a plurality of receive branches coupled to the plurality of antenna elements, respectively. The processing unit is adapted to determine an initial set of null locations for a particular transmit or receive beam based on an initial set of beam weighting factors for the particular transmit or receive beam, and change one or more null locations in the initial set of null locations for the particular transmit or receive beam based on one or more other transmit or receive beams to be used simultaneously with the particular transmit or receive beam, thereby providing a new set of null locations for the particular transmit or receive beam. The processing unit is further adapted to compute a new set of beam weighting factors for the particular transmit or receive beam based on the new set of null locations for the particular transmit or receive beam, and utilize the new set of beam weighting factors to transmit or receive, via at least a subset of the plurality of antenna elements, on the particular transmit or receive beam.

In some embodiments, in order to change the one or more null locations in the initial set of null locations to thereby provide the new set of null locations, the processing unit is further adapted to, for each other transmit or receive beam of the one or more other transmit or receive beams to be used simultaneously with the particular transmit or receive beam, find an initial null location from the set of initial null locations that is closest to a beam direction of the other transmit or receive beam and change the initial null location to a new null location that is at the beam direction of the other transmit or receive beam.

In some embodiments, in order to change the one or more null locations in the initial set of null locations to thereby provide the new set of null locations, the processing unit is further adapted to, for each other transmit or receive beam of the one or more other transmit or receive beams to be used simultaneously with the particular transmit or receive beam, find an initial null location from the set of initial null locations that is closest to a beam direction of the other transmit or receive beam, change the initial null location to a new null location that is at the beam direction of the other transmit or receive beam, and change an additional initial null location from the set of null locations that is near the initial null location to a value in accordance with a filtering effect (e.g., a Gaussian filtering effect or Gaussian distribution).

In some embodiments, the radio system is part of a base station for a cellular communications network.

In some embodiments, the particular transmit or receive beam and the one or more other transmit or receive beams are transmit beams for simultaneous downlink transmissions to respective wireless devices. In some embodiments, the processing unit is further adapted to compute the new set of beam weighting factors for the particular transmit beam based on the new set of null locations for the particular transmit beam and known coupling factors between antenna elements in the at least a subset of the plurality of antenna elements utilized to transmit on the particular transmit beam and antenna elements in at least a subset of the plurality of antenna elements utilized to transmit on the one or more other transmit beams. In some other embodiments, in order to compute the new set of beam weighting factors for the particular transmit beam, the processing unit is further adapted to generate a first set of equations to solve for beam weight correction factors for the particular transmit beam. The first set of equations being based on the particular transmit beam having maximum signal with the beam weight correction factors considering known coupling factors between antenna elements in the at least a subset of the plurality of antenna elements utilized to transmit on the particular transmit beam and antenna elements in at least a subset of the plurality of antenna elements utilized to transmit on the one or more other transmit beams. In order to compute the new set of beam weighting factors for the particular transmit beam, the processing unit is further adapted to generate a second set of equations to solve for the beam weight correction factors based on the new set of null locations, calculate the beam weight correction factors using a numerical method based on the first set of equations and the second set of equations, and apply the beam weight correction factors to the initial set of beam weighting factors for the particular transmit beam to thereby provide the new set of beam weighting factors for the particular transmit beam.

In some embodiments, the particular transmit or receive beam and the one or more other transmit or receive beams are receive beams for reception of simultaneous uplink transmissions from respective wireless devices. In some embodiments, the processing unit is further adapted to compute the new set of beam weighting factors for the particular receive beam based on the new set of null locations for the particular receive beam and a known Signal to Interference plus Noise Ratio (SINR) for the respective wireless device associated with the particular receive beam. In some other embodiments, in order to compute the new set of beam weighting factors for the particular receive beam, the processing unit is further adapted to generate a first set of equations to solve for beam weight correction factors for the particular receive beam, where the first set of equations being based on the particular receive beam having maximum SINR with the beam weight correction factors. In order to compute the new set of beam weighting factors for the particular receive beam, the processing unit is further adapted to generate a second set of equations to solve for the beam weight correction factors based on the new set of null locations, calculate the beam weight correction factors using a numerical method based on the first set of equations and the second set of equations, and apply the beam weight correction factors to the initial set of beam weighting factors for the particular receive beam to thereby provide the new set of beam weighting factors for the particular receive beam.

Embodiments of a method in a radio system are provided. The radio system comprises an antenna system comprising a plurality of antenna elements. The radio system further comprises a plurality of transmit branches coupled to the plurality of antenna elements, respectively, and/or a plurality of receive branches coupled to the plurality of antenna elements, respectively, are provided. In some embodiments, the method comprises determining an initial set of null locations for a particular transmit or receive beam based on an initial set of beam weighting factors for the particular transmit or receive beam, changing one or more null locations in the initial set of null locations for the particular transmit or receive beam based on one or more other transmit or receive beams to be used simultaneously with the particular transmit or receive beam, thereby providing a new set of null locations for the particular transmit or receive beam. The method further comprises computing a new set of beam weighting factors for the particular transmit or receive beam based on the new set of null locations for the particular transmit or receive beam, and utilizing the new set of beam weighting factors to transmit or receive, via at least a subset of the plurality of antenna elements, on the particular transmit or receive beam.

In some embodiments, changing the one or more null locations in the initial set of null locations to thereby provide the new set of null locations comprises, for each other transmit or receive beam of the one or more other transmit or receive beams to be used simultaneously with the particular transmit or receive beam, finding an initial null location from the set of initial null locations that is closest to a beam direction of the other transmit or receive beam and changing the initial null location to a new null location that is at the beam direction of other transmit or receive beam.

In some embodiments, changing the one or more null locations in the initial set of null locations to thereby provide the new set of null locations comprises, for each other transmit or receive beam of the one or more other transmit or receive beams to be used simultaneously with the particular transmit or receive beam, finding an initial null location from the set of initial null locations that is closest to a beam direction of the other transmit or receive beam, changing the initial null location to a new null location that is at the beam direction of the other transmit or receive beam, and changing an additional initial null location from the set of null locations that is near the initial null location to a value that is in accordance with a filtering effect (e.g., a Gaussian filtering effect or a Gaussian distribution).

In some embodiments, the radio system is part of a base station for a cellular communications network.

In some embodiments, the particular transmit or receive beam and the one or more other transmit or receive beams are transmit beams for simultaneous downlink transmissions to respective wireless devices. In some embodiments, computing the new set of beam weighting factors comprises computing the new set of beam weighting factors for the particular transmit beam based on the new set of null locations for the particular transmit beam and known coupling factors between antenna elements in the at least a subset of the plurality of antenna elements utilized to transmit on the particular transmit beam and antenna elements in at least a subset of the plurality of antenna elements utilized to transmit on the one or more other transmit beams. In some other embodiments, computing the new set of beam weighting factors for the particular transmit beam comprises generating a first set of equations to solve for a beam weight correction factors for the particular transmit beam, where the first set of equations is based on the particular transmit beam having maximum signal with the beam weight correction factor considering known coupling factors between antenna elements in the at least a subset of the plurality of antenna elements utilized to transmit on the particular transmit beam and antenna elements in at least a subset of the plurality of antenna elements utilized to transmit on the one or more other transmit beams. Computing the new set of beam weighting factors for the particular transmit beam further comprises generating a second set of equations to solve for the beam weight correction factors, the second set of equations being based on the new set of null locations, calculating the beam weight correction factors using a numerical method based on the first set of equations and the second set of equations, and applying the beam weight correction factors to the initial set of beam weighting factors for the particular transmit beam to thereby provide the new set of beam weighting factors for the particular transmit beam.

In some embodiments, the particular transmit or receive beam and the one or more other transmit or receive beams are receive beams for reception of simultaneous uplink transmissions from respective wireless devices. In some embodiments, computing the new set of beam weighting factors for the particular receive beam comprises computing the new set of beam weighting factors for the particular receive beam based on the new set of null locations for the particular receive beam and a known SINR for the respective wireless device associated with the particular receive beam. In some other embodiments, computing the new set of beam weighting factors for the particular receive beam comprises generating a first set of equations to solve for beam weight correction factors for the particular receive beam, where the first set of equations is based on the particular receive beam having maximum SINR with the beam weight correction factors. Computing the new set of beam weighting factors for the particular receive beam further comprises generating a second set of equations to solve for the beam weight correction factors, the second set of equations being based on the new set of null locations, calculating the beam weight correction factors using a numerical method based on the first set of equations and the second set of equations, and applying the beam weight correction factors to the initial set of beam weighting factors for the particular receive beam to thereby provide the new set of beam weighting factors for the particular receive beam.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 4 illustrates one example of a two-dimensional implementation of the antenna array of the antenna system of FIGS. 2 and 3;

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless device.

Radio Access Node: As used herein, a "radio access node" or "radio network node" is any node in a radio access network of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network. Some examples of a core network node include, e.g., a Mobility Management Entity (MME), a Packet Data Network Gateway (P-GW), a Service Capability Exposure Function (SCEF), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP network and a Machine Type Communication (MTC) device.

Network Node: As used herein, a "network node" is any node that is either part of the radio access network or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

Figure 1:
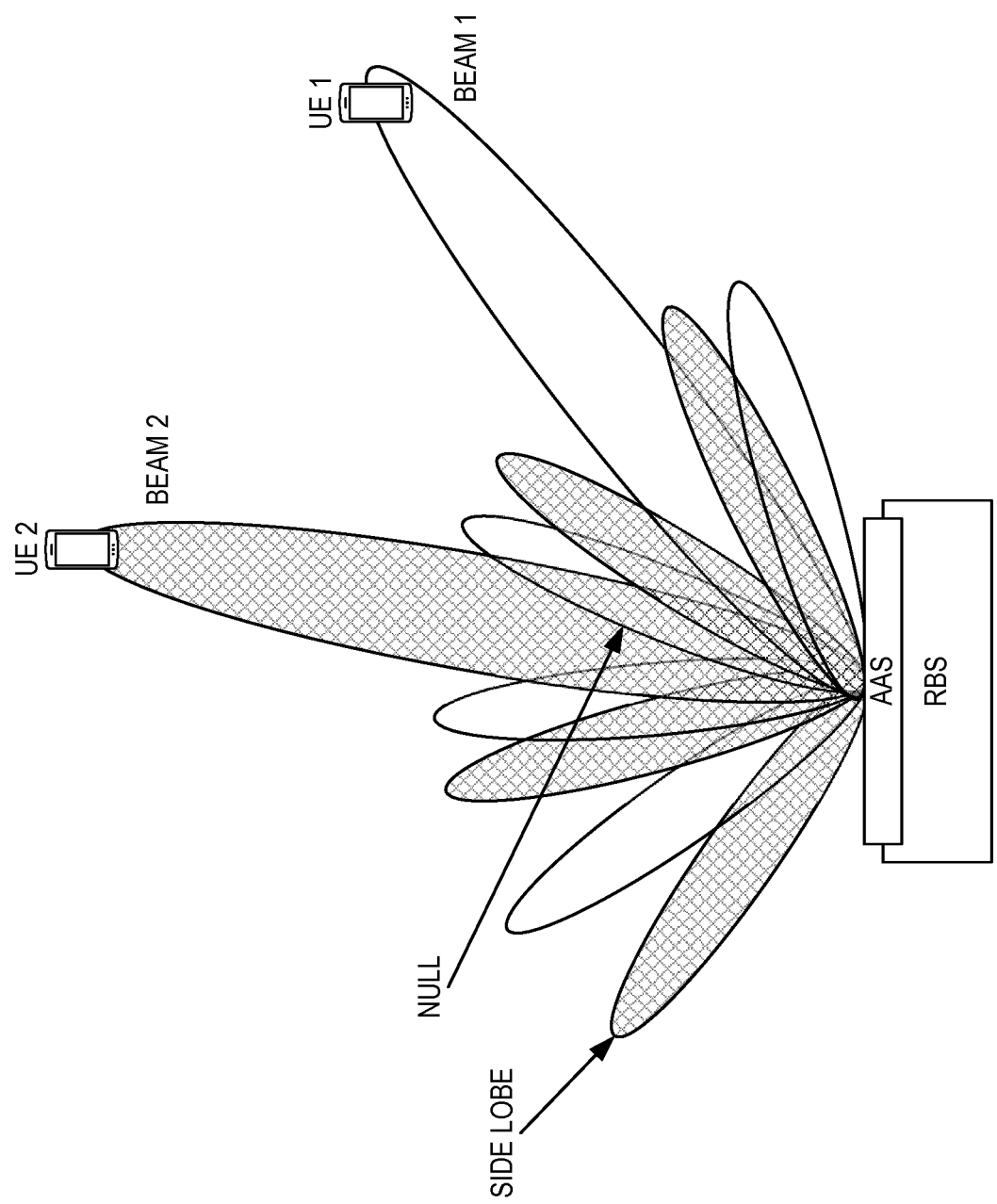
FIG. 1 illustrates an example of a beam having a null at a direction of a main lobe of another beam.

Systems and methods are disclosed herein for computing beam weighting factors for multiple spatial multiplexing beams that utilize the same time and frequency resources in such a manner that full orthogonality between beams is provided and, thus, interference between beams is mitigated. In general, for each beam, a beam weighting factor is computed for the beam that provides a main lobe at a desired beam direction of the beam and nulls at the beam directions of the other beams. Thus, multiple beams from different physical or virtual subarray in a same antenna array can be generated simultaneously in such a manner that mitigates interference between beams. An example is illustrated in FIG. 1. As shown in FIG. 1, Beam 1 to UE 1 has a null at the direction of the main lobe of Beam 2 to UE 2, and Beam 2 to UE 2 has a null at the direction of the main lobe of Beam 1 to UE 1. Embodiments for both uplink and downlink are provided. For uplink, the beam weighting factor can be computed for both real time traffic as well as general beam direction. For downlink, the beam weighting factor is computed is such a manner as to consider coupling effects between antenna elements.

While not being limited to or by any particular advantage, embodiments of the present disclosure provide a number of advantages. For example, embodiments of the present disclosure provide dynamic beam weighting factor calculation, on-the-fly updating of beam weighting factors, consideration of coupling effects among antenna elements for the downlink, and adaptation of beam weighting factors in uplink based on real wireless device signal strength such that wireless devices with weaker signal strength get higher isolation.

Figure 2:
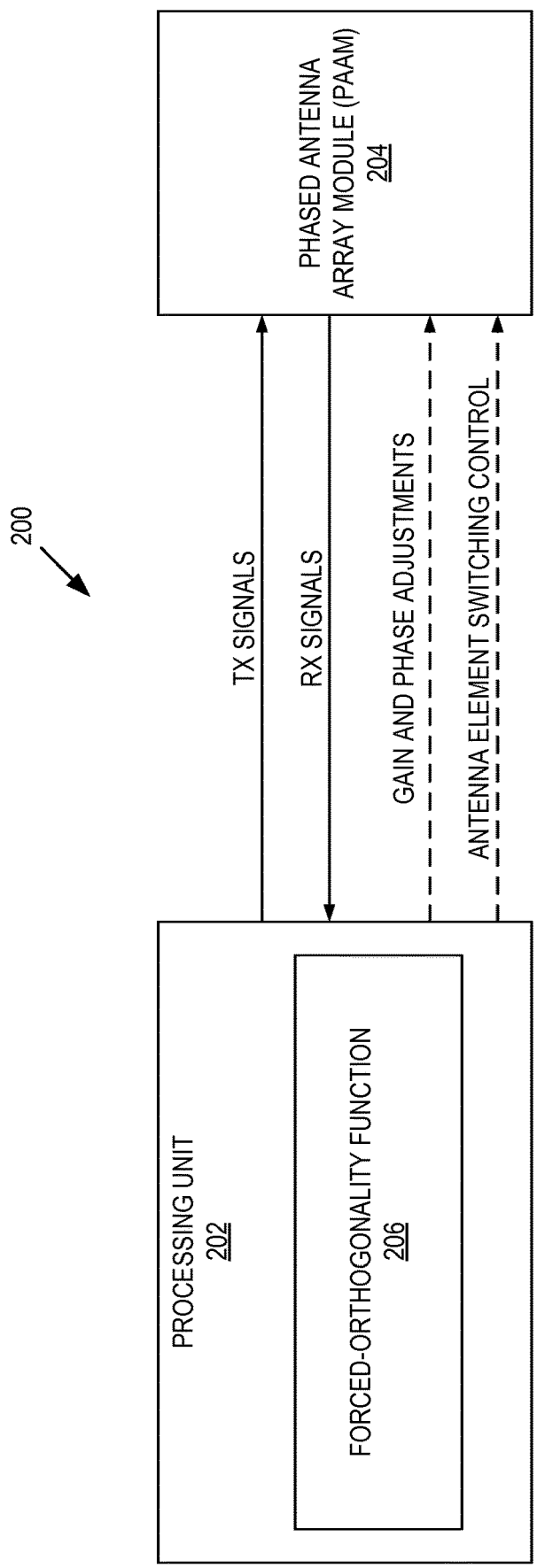
FIG. 2 illustrates an example embodiment of a radio system that provides forced orthogonality between spatial multiplexing beams using the same time and frequency resources according to embodiments of the present disclosure.

FIG. 2 illustrates an example embodiment of a radio system 200 that provides forced orthogonality between spatial multiplexing beams using the same time and frequency resources according to embodiments of the present disclosure. The radio system 200 is also referred to herein as a beamforming transceiver. The radio system 200 is preferably a radio access node in a cellular communications network (e.g., a base station in a 3GPP 5G NR network) or implemented in a radio access node in a cellular communications system.

However, the radio system 200 may alternatively be, for example, an access point in a local wireless network (e.g., an access point in a WiFi network), a wireless communication device (e.g., a UE in a 3GPP 5G NR network), or the like. The radio system 200 performs beamforming via an antenna array. This beamforming may be, e.g., analog beamforming, which is performed by controlling gain and phase for each antenna branch via respective gain and phase control elements. However, it should be appreciated that, in some other embodiments, the radio system 200 may perform, e.g., hybrid beamforming, i.e., perform beamforming partly in the digital domain and partly in the analog domain or may perform digital beamforming (i.e., beamforming fully in the digital domain). Preferably, the radio system 200 utilizes beamforming for Multi-User Multiple-Input-Multiple-Output (MU-MIMO) transmission and/or reception.

As illustrated, the radio system 200 includes a processing unit 202 and a Phased Antenna Array Module (PAAM) 204. Note that the term "PAAM" is used herein only for reference. Other names may be used. For example, the PAAM 204 may also be referred to herein as an Advanced Antenna System (AAS) or simply an antenna system. In some embodiments, the PAAM 204 is implemented as one or more radio ASICs, and the processing unit 202 is a baseband processing unit implemented as, e.g., one or more processors such as, e.g., one or more CPUs, one or more baseband ASICs, one or more Field Programmable Gate Arrays (FPGAs), or the like, or any combination thereof.

As discussed below in detail, the PAAM 204 includes an antenna array. The antenna array includes many Antenna Elements (AEs). The PAAM 204 includes separate transmit branches (also referred to herein as transmit paths) and separate receive branches (also referred to herein as receive paths) for each AE. As an example, each transmit branch includes a gain control element and a phase control element that are controlled by the processing unit 202 to provide gain and phase calibration between the transmit branches and, in some embodiments, analog beamforming for signals transmitted by the radio system 200. Note that analog calibration and analog beamforming are shown herein as an example; however, the present disclosure is not limited thereto. Likewise, each receive branch includes a gain control element and a phase control element that are controlled by the processing unit 202 to provide gain and phase calibration between the receive branches, and in some embodiments, analog beamforming for signals received by the radio system 200.

The processing unit 202 includes a forced-orthogonality function 206. The forced-orthogonality function 206 may be implemented in hardware or a combination of hardware and software. In some embodiments, at least some of the functionality of the forced-orthogonality function 206 described herein is implemented in software that is executed by one or more processors (e.g., one or more CPUs, one or more ASICs, one or more FGPAs, or the like, or any combination thereof). In an alternative, the forced-orthogonality function 206 is implemented "in the cloud" or implemented as a virtualized apparatus (e.g., a virtual machine) running in a virtualization environment on a network node (e.g., a computer or similar network node) connected to the processing unit 202 and/or the PAAM 204 via a network connection. As described below in detail, for MU-MIMO operation in which the radio system 200 is to transmit or receive in multiple beam directions simultaneously, the forced-orthogonality function 206 computes, for each of those beam directions, a set of beam weighting factors for the beam direction that generates nulls at the other beam directions. In this manner, full orthogonality between these beams can be achieved.

Figure 3:
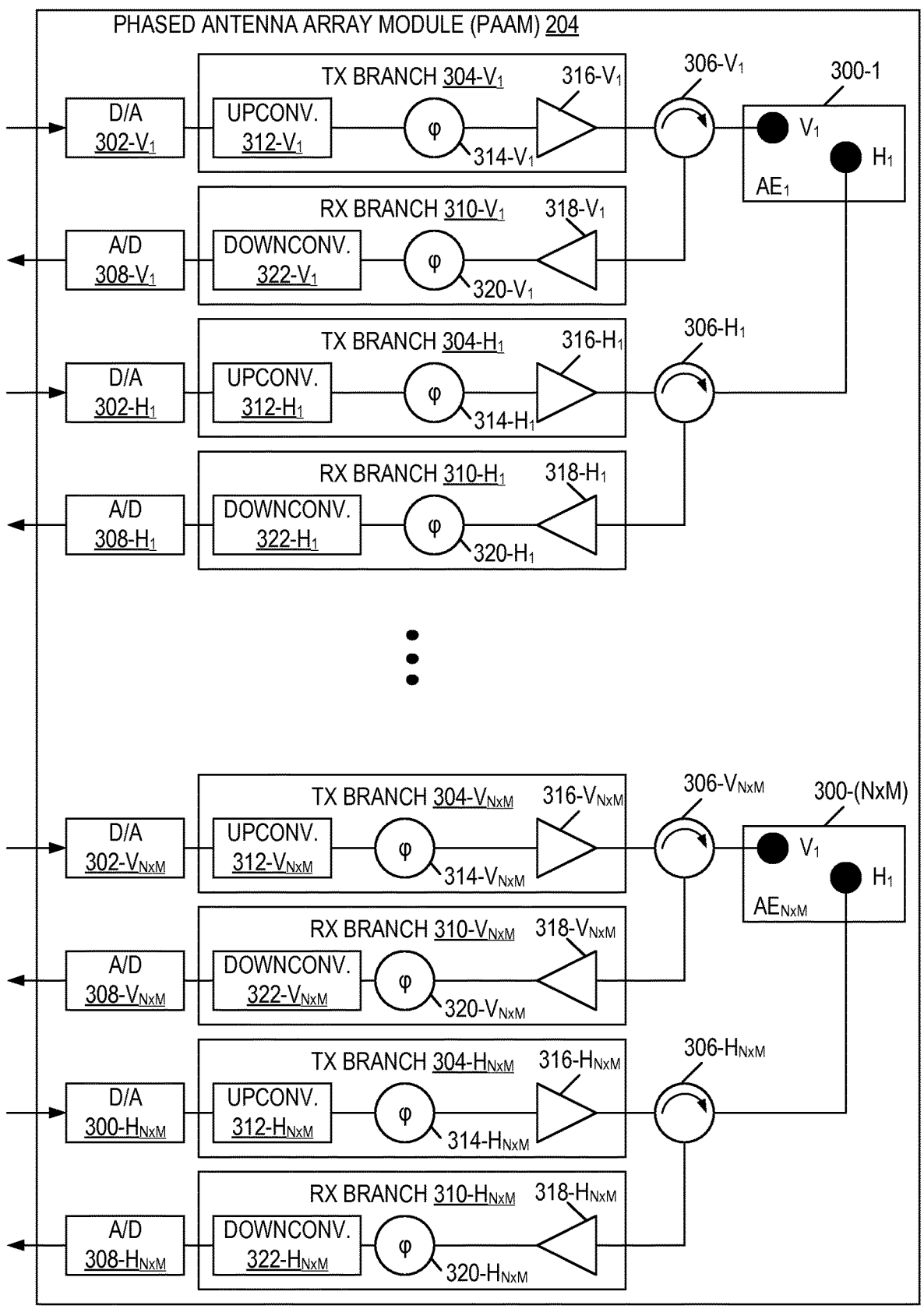
FIG. 3 illustrates one example of antenna system of FIG. 2.
Figure 4:
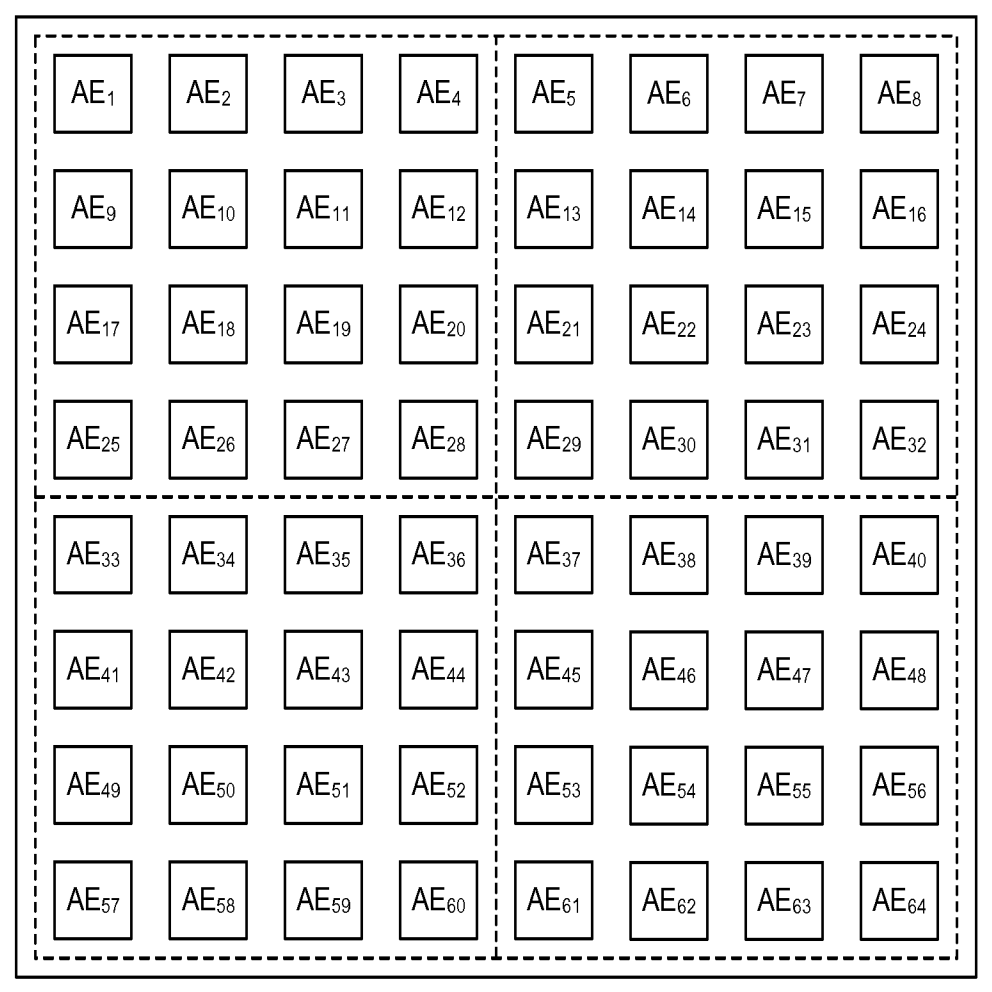
Figure 5:
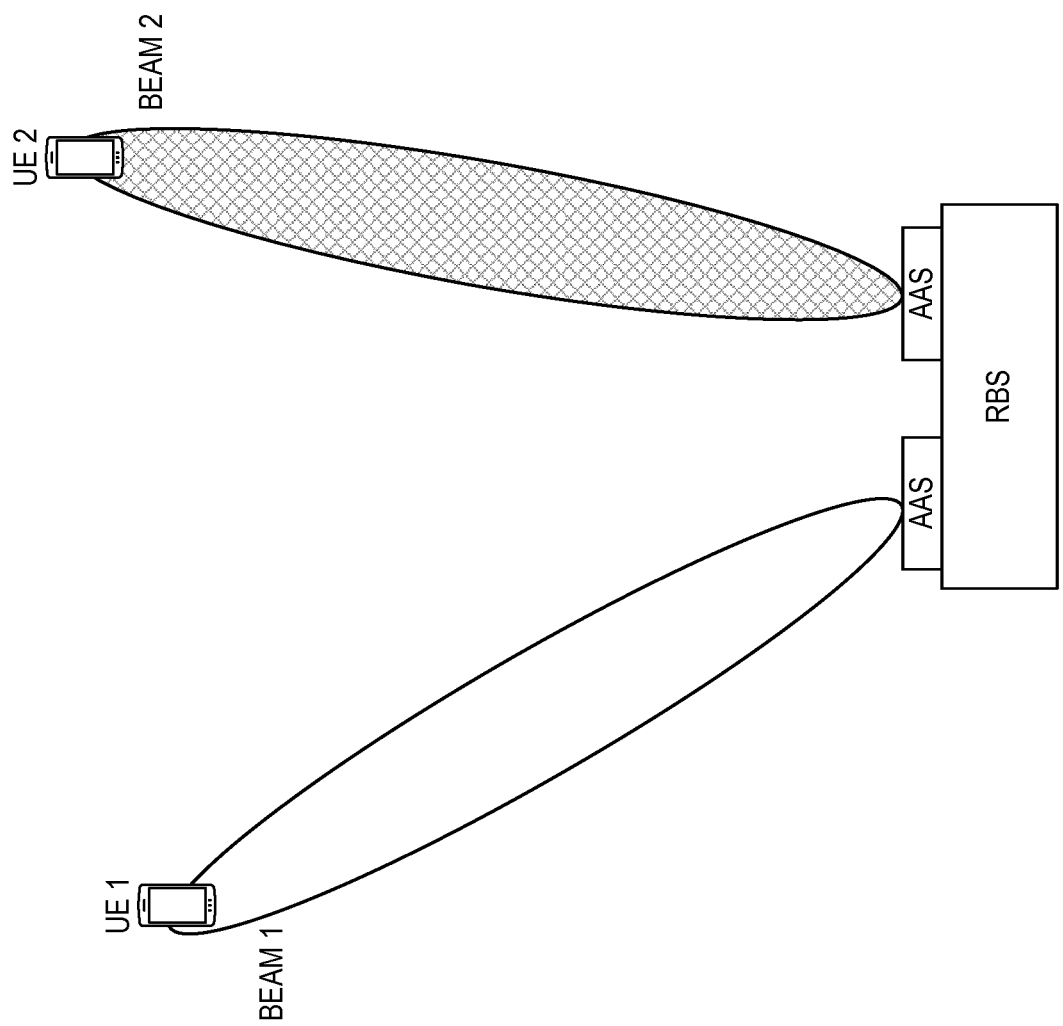
FIG. 5 illustrates one example of analog beamforming.
Figure 6:
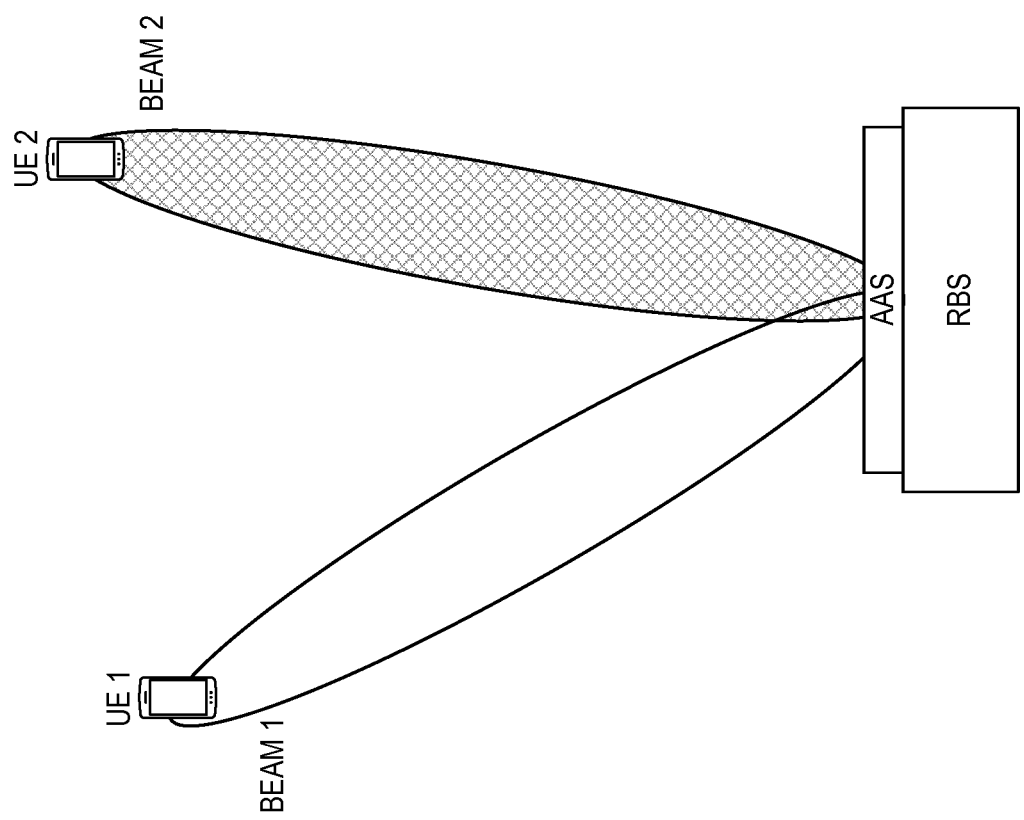
FIG. 6 illustrates one example of digital beamforming.

FIG. 3 illustrates one example of the PAAM 204. As illustrated in FIG. 3, the PAAM 204 includes AEs 300-1 through 300-(N×M), where N×M defines the dimensions of a two-dimensional (2D) matrix of AEs into which the AEs 300-1 through 300-(N×M) are arranged. The AEs 300-1 through 300-(N×M) are generally referred to herein collectively as AEs 300 and individually as AE 300. FIG. 4 illustrates one example of such a 2D matrix in which N=8 and M=8 such that there are 64 AEs 300 arranged into a 2D matrix. In the example of FIG. 4, the AEs 300 are implemented on four separate Integrated Circuits (ICs) (e.g., four separate radio ASICs), as indicated by the dashed boxes. Returning to FIG. 3, in the illustrated example, each AE 300 is a dual-polarized AE having two polarizations, namely, a vertical polarization and a horizontal polarization having respective inputs. For example, the AE 300-1 has a first Input/Output (I/O) connection point ($V_1$) for the vertical polarization and a second I/O connection point ($H_1$) for the horizontal polarization.

In this example with two polarizations, for the vertical polarization of each i-th AE 300-$i$ (where i=1, 2, . . . , N×M), the PAAM 204 includes a Digital to Analog (D/A) converter 302-$V_i$ and a transmit (TX) branch 304-$V_i$ coupled to the vertical I/O connection point ($V_i$) of the AE 300-$i$ via a circulator (duplexer or Rx-Tx switch), 306-$V_i$ for the transmit direction and an Analog to Digital (ND) converter 308-$V_i$ and a receive (RX) branch 310-$V_i$ coupled to the vertical I/O connection point ($V_i$) of the AE 300-$i$ via the circulator 306-$V_i$. The TX branch 304-$V_i$ includes upconversion circuitry 312-$V_i$, a phase adjustor, or phase control element, 314-$V_i$, and an amplifier, or gain control element, 316-$V_i$. While not illustrated, the phase adjustor 314-$V_i$ and the amplifier 316-$V_i$ are controlled by the processing unit 202 to thereby control the gain and phase of the TX branch 304-$V_i$. Similarly, the RX branch 310-$V_i$ includes an amplifier, or gain control element, 318-$V_i$, a phase adjustor, or phase control element, 320-$V_i$, and downconversion circuitry 322-$V_i$. While not illustrated, the amplifier 318-$V_i$ and the phase adjustor 320-$V_i$ are controlled by the processing unit 202 to thereby control the gain and phase of the RX branch 310-$V_i$.

For the horizontal polarization of each i-th AE 300-$i$ (where i=1, 2, . . . , N×M), the PAAM 204 includes a D/A converter 302-$H_i$ and a TX branch 304-$H_i$ coupled to the horizontal I/O connection point ($H_i$) of the AE 300-$i$ via a circulator, or duplexer, 306-$H_i$ for the transmit direction and an ND converter 308-$H_i$ and a RX branch 310-$H_i$ coupled to the horizontal I/O connection point ($H_i$) of the AE 300-$i$ via the circulator 306-$H_i$. The TX branch 304-$H_i$ includes upconversion circuitry 312-$H_i$, a phase adjustor, or phase control element, 314-$H_i$, and an amplifier, or gain control element, 316-$H_i$. While not illustrated, the phase adjustor 314-$H_i$ and the amplifier 316-$H_i$ are controlled by the processing unit 202 to thereby control the gain and phase of the TX branch 304-$H_i$. Similarly, the RX branch 310-$H_i$ includes an amplifier, or gain control element, 318-$H_i$, a phase adjustor, or phase control element, 320-$H_i$, and downconversion circuitry 322-$H_i$. While not illustrated, the amplifier 318-$H_i$ and the phase adjustor 320-$H_i$ are controlled by the processing unit 202 to thereby control the gain and phase of the RX branch 310-$H_i$.

Notably, when an AE 300-$i$ is configured for TX (i.e., coupled to the TX branch 304-$V_i$ and/or the TX branch 304-$H_i$), the AE 300-$i$ is referred to herein as a "TX AE" or "transmit AE." Conversely, when an AE 300-$i$ is configured for RX (i.e., coupled to the RX branch 310-$V_i$ and/or the RX branch 310-$H_i$), the AE 300-$i$ is referred to herein as a "RX AE" or "receive AE."

Figure 7:
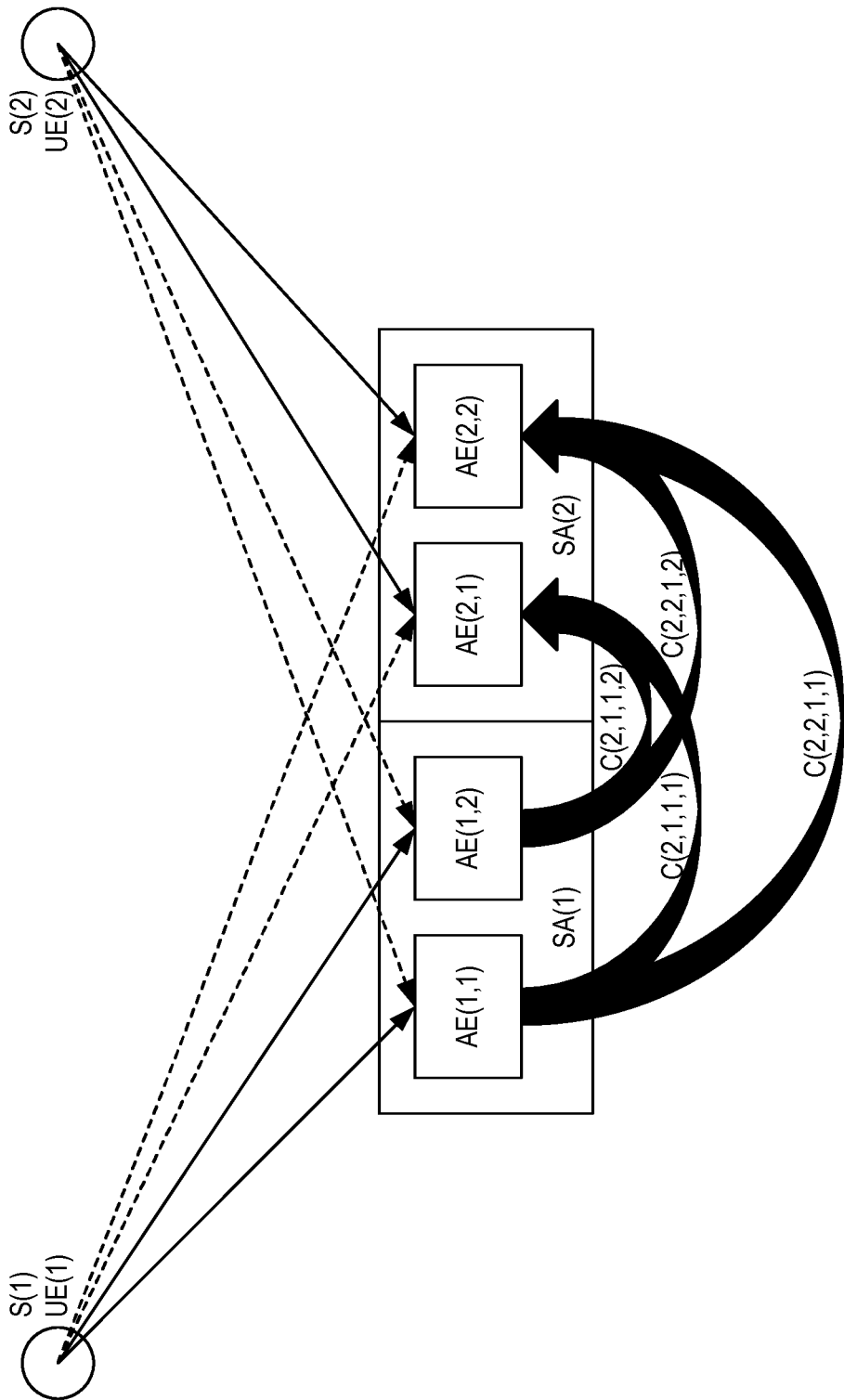
FIG. 7 illustrates one example of the antenna array of the antenna system of FIGS. 2 and 3 that is used to assist in the description of details of the force-orthogonality procedure of the present disclosure.

As described below, the forced-orthogonality function 206 operates to compute beam weighting factors for a set of spatial multiplexing beams (i.e., transmit or receive beams) to be simultaneously used (i.e., used on the same time and frequency resources) by the radio system 200 in such a manner that, for each spatial multiplexing beam, the beam weighting factor for that spatial multiplexing beam provides nulls at the beam directions of the other spatial multiplexing beams. In order to assist in the description of the details for how the beam weighting factors are computed, FIG. 7 illustrates one example of the antenna array of the PAAM 204. In this example, the antenna array is a linear array that includes two sub-arrays, each including N=2 AEs. Note that the two sub-arrays may be physical sub-arrays each including different physical AEs 300 or virtual sub-arrays using the same physical AEs 300. The first sub-array is denoted as SA(1), and the AEs of the first sub-array SA(1) are denoted as AE(1,1) and AE(1,2). The second sub-array is denoted as SA(2), and the AEs of the second sub-array SA(2) are denoted as AE(2,1) and AE(2,2). The first sub-array SA(1) is used form a first spatial multiplexing beam in the direction of a first UE, denoted as UE(1). The second sub-array SA(2) is used for form a second spatial multiplexing beam in the direction of a second UE, denoted as UE(2). Direction can be referred to azimuth ($\alpha(u)$) angle keeping elevation $\beta(3)$ to zero. There are known coupling effects between the sub-arrays SA(1) and SA(2). In this example, the coupling between AE(1,1) and AE(2,1) is denoted as C(2,1,1,1), the coupling between AE(1,1) and AE(2,2) is denoted as C(2,2,1,1), the coupling between AE(1,2) and AE(2,1) is denoted as C(2,1,1,2), and the coupling between AE(1,2) and AE(2,2) is denoted as C(2,2,1,2).

Before proceeding, a brief discussion regarding notation is beneficial. In the discussion below, "a" denotes the sub-array number, "e" denotes the AE number, and "u" denotes the UE number. So, for example, the first sub-array SA(1) may also be denoted as SA(a=1), AE(1,1) may also be denoted as AE(a=1, e=1), and UE(1) may also be noted as UE(u=1).

For the downlink, the total signal transmitted in the direction of UE(1) with is denoted as S(1), which is also denoted as S(u=1). The total signal transmitted in the direction of UE(1) can be expressed as:

$$S(u=1)=S(a=1,e=1,u=1)+S(a=1,e=2,u=1)$$

where S(a=1, e=1, u=1) is the signal transmitted as via AE(a=1, e=1) of sub-array SA(a=1) for UE(u=1), and S(a=1, e=2, u=1) is the signal transmitted as via AE(a=1, e=2) of sub-array SA(a=1) for UE(u=1).

More specifically, for AE(a=1, e=1) of the sub-array SA(a=1), the signal S(a=1, e=1, u=1) for UE(u=1) can be expressed as:

$$\begin{aligned}S(a=1, e=1, u=1) = \quad &\text{Eqn (1)}\\ s(u=1)EF(u=1)W(a=1, e=1, u=1)V(a=1, e=1, u=1) + \\ s(u=1)EF(u=1)\Gamma(a=2, e=1)C((a=2, e=1), (a=1, e=1)) \\ EF(u=1)V(a=2, e=1, u=1) + s(u=1)\Gamma(a=2, e=2) \\ C((a=2, e=2), (a=1, e=1))EF(u=1)B(a=2, e=1, u=1)\end{aligned}$$

where:
  s(u=1) is the signal transmitted to UE(u=1),
  EF(u=1) is an element factor for all AEs for the beam direction for UE(u=1),
  W(a=1, e=1, u=1) is the normalized beam weighting factor for AE(a=1, e=1) of the sub-array SA(a=1) for UE(u=1),
  V(a=1, e=1, u=1) is an array factor for AE(a=1, e=1) of the sub-array SA(a=1) for UE(u=1),
  $\Gamma$(a=2, e=1) is the reflection coefficient,
  C((a=2, e=1), (a=1, e=1)) is the known coupling factor between AE(a=2, e=1) and AE(a=1, e=1),
  V(a=2, e=1, u=1) is an array factor for AE(a=2, e=1) of the sub-array SA(a=1) for UE(u=1),
  $\Gamma$(a=2, e=2) is the reflection coefficient, and
  C((a=2, e=2), (a=1, e=1)) is the known coupling factor between AE(a=2, e=2) and AE(a=1, e=1).

The weighting factor W(a=1, e=1, u=1) is the inverse of the array factor V(a=1, e=1, u=1). More generally, $$W(a, e, u) = \frac{1}{V(a, e, u)}$$

where W (a, e, u) denotes the weighting factor for any given values of a, e, and u, and V(a, e, u) denotes the array factor for the same given values of a, e, and u. This relationship between W(a, e, u) and V(a, e, u) ensures maximum power in the beam direction.

More generally, the signal S(a=1, e=1, u=1) for UE(u=1) can alternatively be expressed as:

$$\begin{aligned}S(a=1, e=1, u=1) =\ & s(u) \qquad\qquad\text{Eqn (2)}\\
=\ & 1)(W(a=1, e=1, u=1)\\
& EF(u=1)V(a=1,\\
& e=1, u=1) +\\
& \sum_{j=1}^{a=2, j=N} \Gamma(a=2, e\\
=\ & j)EF(u=1)C((a=2, e=j),\\
& (a=1, e=1))V(a=2, e=j, u\\
=\ & 1))\end{aligned}$$

where N is the number of AEs the sub-array SA(a=1).

Thus, a generalized equation for a signal from one element in sub-array SA(a=1) for UE(u=1) can be written as:

$$\begin{aligned}S(a=1, e, u=1) =\ & s(a \qquad\qquad\text{Eqn (3)}\\
=\ & 1)(W(a=1, e, u=1)V(a=1, e,\\
& u=1)EF(u=1) + \sum_{j=1}^{a=2, j=N}\\
& EF(u=1)\Gamma(a\\
=\ & 2, j)C((a=2, j),\\
& (a=1, e))V(a=2, h, u=1))\end{aligned}$$

Similarly, a generalized equation for a signal from one element in sub-array SA(a=2) for UE(u=2) can be written as:

$$\begin{aligned}S(a=2, e, u=2) =\ & s(a \qquad\qquad\text{Eqn (4)}\\
=\ & 2)(W(a=2, e, u=2)V(a=2, e,\\
& u=1)EF(u=1) + \sum_{j}^{a=2, j=N}\\
& EF(u=1)\Gamma(a\\
=\ & 1, j)C((a=1, j),\\
& (a=2, e))V(a=1, h, u=1))\end{aligned}$$

The total signal St(u) at a particular UE can be expressed as:

$$St(u) = \sum_a \sum_e^N S(a, e, u) \qquad\text{Eqn (5)}$$

$$St(u) = \sum_a \sum_e^N s(a)EF(u) \qquad\text{Eqn (6)}$$

$$\left( W(a, e, u)V(a, e, u) + \sum_{j=1}^{a2 \neq a, j=N} \Gamma(a2, j)C((a2, j), (a, e))V(a2, j, u) \right)$$

For UE(u=1) in downlink:

$$St(1) = \qquad\qquad\text{Eqn (7)}$$

$$EF(1)s(1)\left( N + \sum_e^N \left[ \sum_j^{a2 \neq 1, j=N} \Gamma(a2, j)C((a2, j), (1, e))V(a2, j, 1) \right] \right) +$$

$$\sum_a^{a \neq 1} s(a) \sum_e^N \left( W(a, e, a)V(a, e, 1) + \sum_j^{a2 \neq a, j=N} \Gamma(a2, j)C((a2, j), (a, e))V(a2, j, 1) \right)$$

where C((a2, j), (a1, e)) is coupling between elements of different sub array and $$\Gamma(a, j) = \frac{1}{1 - S_{ajaj}}$$

is the antenna impedance matching factor. Also, note that W (a, e, 1)V(a, e, 1)=1.

For full orthogonality $$St(1) = EF(1)s(1) \sum_e^N W_x(a, e, 1)V(a, e, 1) \qquad\text{Eqn (8)}$$

Here, we normalized the free space path loss where $W_x(a, e, 1) = W(a, e, 1)W_{cf}(a, e, 1)$, and $W_{cf}(a, e, 1)$ is the beam correction factor to accommodate.

$$St(1) = EF(1)s(1) \sum_e^N W_{cf}(a, e, 1) \qquad\text{Eqn (9)}$$

For uplink, the received signal is denoted as Sr(u). In uplink, the coupling part can be ignored as Γ(a, j) is zero because of matched Low Noise Amplifiers (LNAs). Thus, $$Sr(u) = \sum_a \sum_e^N S(a, e, u) \qquad\text{Eqn (10)}$$

which can be re-written as:

$$Sr(u) = EF(u)\sum_a s(a)\sum_e^N (W(a, e, u)V(a, e, u)) + n_0(a) \quad \text{Eqn (11)}$$

For UE1 in the uplink, $$Sr(u = 1) = \quad \text{Eqn (12)}$$
$$EF(1)s(1)N + EF(1)\sum_a^{\neq 1} s(a)\sum_e^N (W(a, e, 1)V(a, e, 1)) + n_0(a)$$

For full orthogonality $$Sr(1) = EF(1)s(1)\sum_e^N W_{cr}(1, e, 1) \quad \text{Eqn (13)}$$

For the downlink, from equations (7) and (10):

$$EF(1)s(1)\sum_e^N W_{ct}(a, e, 1) =$$

$$EF(1)s(1)\left(N + \sum_e^N \left(\sum_j^{a2\neq 1, j=N} \Gamma(a2, j)C((a2, j), (1, e))V(a2, j, 1)\right)\right) + \sum_a^{\neq 1} s(a)$$

$$\sum_e^N \left(W_x(a, e, a)V(a, e, 1) + \sum_j^{a2\neq a, j=N} \Gamma(a2, j)C((a2, j), (a, e))V(a2, j, 1)\right)$$

or $$EF(1)s(1)\left(N + \sum_e^N \left(\sum_j^{a2\neq 1, j=N} \Gamma(a2, j)C((a2, j), (1, e))V(a2, j, 1)\right) -$$

$$\sum_e^N W_{c,t}(a, e, 1)\right) + \sum_a^{\neq 1} s(a)\sum_e^N \left(W(a, e, a)W_{ct}(a, e, a)V(a, e, 1) +$$

$$\sum_j^{a2\neq ja, j=N} \Gamma(a2, j)C((a2, j), (a, e))V(a2, j, 1)\right) = 0$$

Considering same power for all beam s(a)=1

$$\left(N + \sum_e^N \left(\sum_j^{a2\neq 1, j=N} \Gamma(a2, j)C((a2, j), (1, e))V(a2, j, 1)\right) - \quad \text{Eqn (14)}$$

$$\sum_e^N W_{ct}(a, e, 1)\right) +$$

$$\sum_a^{\neq 1}\sum_e^N \left(W(a, e, 1)W_{ct}(a, e, 1)V(a, e, 1) +$$

$$\sum_j^{a2\neq a, j=N} \Gamma(a2, j)C((a2, j), (a, e))V(a2, j, 1)\right) = 0$$

Similarly, for uplink from equations (10) and (13):

$$EF(1)s(1)N + EF(1)\sum_a^{\neq 1} s(a)\sum_e^N (W(1, e, u)V(a, e, u)) + n_0(a) =$$

$$EF(1)s(1)\sum_e^N W_{cr}(1, e, 1)$$

or $$EF(1)s(1)N - EF(1)s(1)\sum_e^N W_{cr}(1, e, 1) +$$

$$EF(1)\sum_a^{\neq 1} s(a)\sum_e^N (W(1, e, u)V(a, e, u)) + n_0(1) = 0$$

Now $$n_0(1) = \frac{EF(1)s(1)N}{snr(1)},$$

where snr(1) is the measured signal to noise ratio when other UE are not communicating.

$$s(1)\left(N + \frac{N}{snr(1)} - \sum_e^N W_{cr}(1, e, 1)\right) + \quad \text{Eqn (15)}$$

$$\sum_a^{\neq 1} s(a)\sum_e^N (W_{cr}(1, e, 1)W(1, e, 1)V(a, e, 1)) = 0$$

Therefore, for both uplink and downlink, a set of equation can be generated at the UE beam direction. However, if the total number of AEs is less than total number of UEs, which is generally the case, then the number of unknowns (i.e., $W_{ct}$ and $W_{cr}$) will be higher than number of equations. In that case, knowledge of the null points for each beam can be used to create additional equations. The equation for a radiation null is:

$$\sum_e^N (W_{cr}(a, e, 1)W(a, e, 1)V(a, e \text{ null\_i})) = 0 \quad \text{Eqn (16)}$$

Note that $W_{ct}$ is similar to $W_{cr}$, only for the uplink.

For a beam forming subarray with N AEs, the expected number of nulls is N in the azimuth-elevation plane. Thus, the total number of equations will be higher than the number unknown ($W_{ct}$ or $W_{cr}$). In this way, by creating additional equations based on the nulls of the beams, an over-deterministic system of equations can be created to solve for the unknowns. The unknowns can be calculated using any numerical method such as, e.g., the Newton Raphson method [2].

Figure 8:
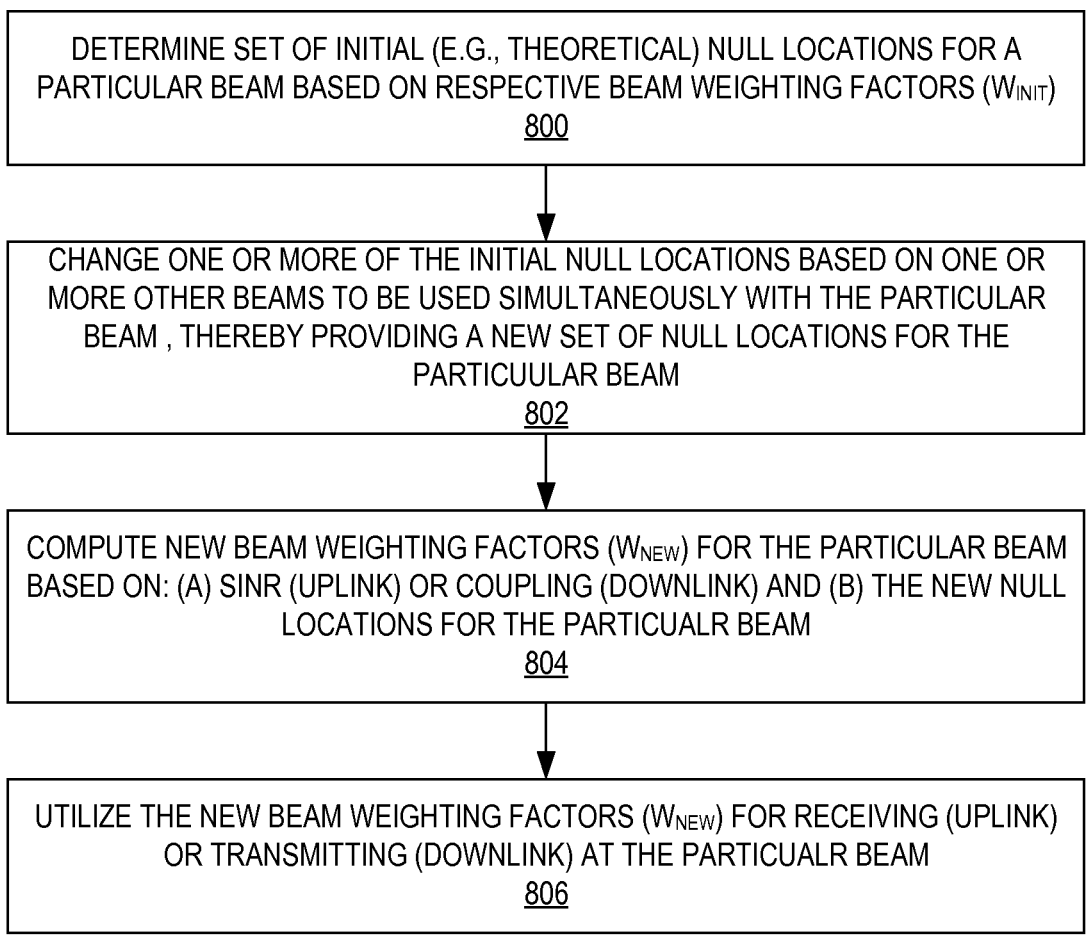
FIG. 8 is a flow chart that illustrates a forced-orthogonality procedure for computing beam weighting factors in accordance with some embodiments of the present disclosure.

The forced-orthogonality procedure disclosed herein intelligently positions the nulls of the beams in such a manner as to mitigate interference between beams that are simultaneously used on the same time and frequency resources. In this regard, FIG. 8 is a flow chart that illustrates a forced-orthogonality procedure for computing beam weighting factors in accordance with some embodiments of the present disclosure. In some embodiments, this process is performed by the forced-orthogonality function 206 of the processing unit 202 of the radio system 200 of FIG. 2. However, the present disclosure is not limited thereto.

As illustrated in FIG. 8, a set of initial (e.g., theoretical) null locations for a particular beam is determined based on a respective set of beam weighting factors ($W_{INIT}$) (step 800). Using the nomenclature from above, the particular beam is for a particular UE, and the set of initial beam weighting factors can be expressed as the set of N beam weighting factors $\{W(a, e, u)\}_{e=1,2, \ldots, N}$ for a given value of a that corresponds to the subarray used to form the particular beam and a given value of u that corresponds to the particular UE.

One or more of the initial null locations for the particular beam are then changed based on one or more other beams to be used simultaneously (i.e., on the same time and frequency resources) with the particular beam (step 802). In this manner, a set of new null locations for the particular beam is created. More specifically, as discussed below in detail, for each of the other beams, the initial null location that is closest to the respective beam direction (i.e., at the location of the main lobe of the other beam) is identified and moved to the beam direction of the other beam. In this context, moving the identified null location means that, within the new set of null locations, the initial null location is replaced with a new null location that is at the beam direction of the other beam. Optionally, other neighboring initial null locations are also moved to values that are in accordance with a filtering effect (e.g., a Gaussian filtering effect).

Figure 9:
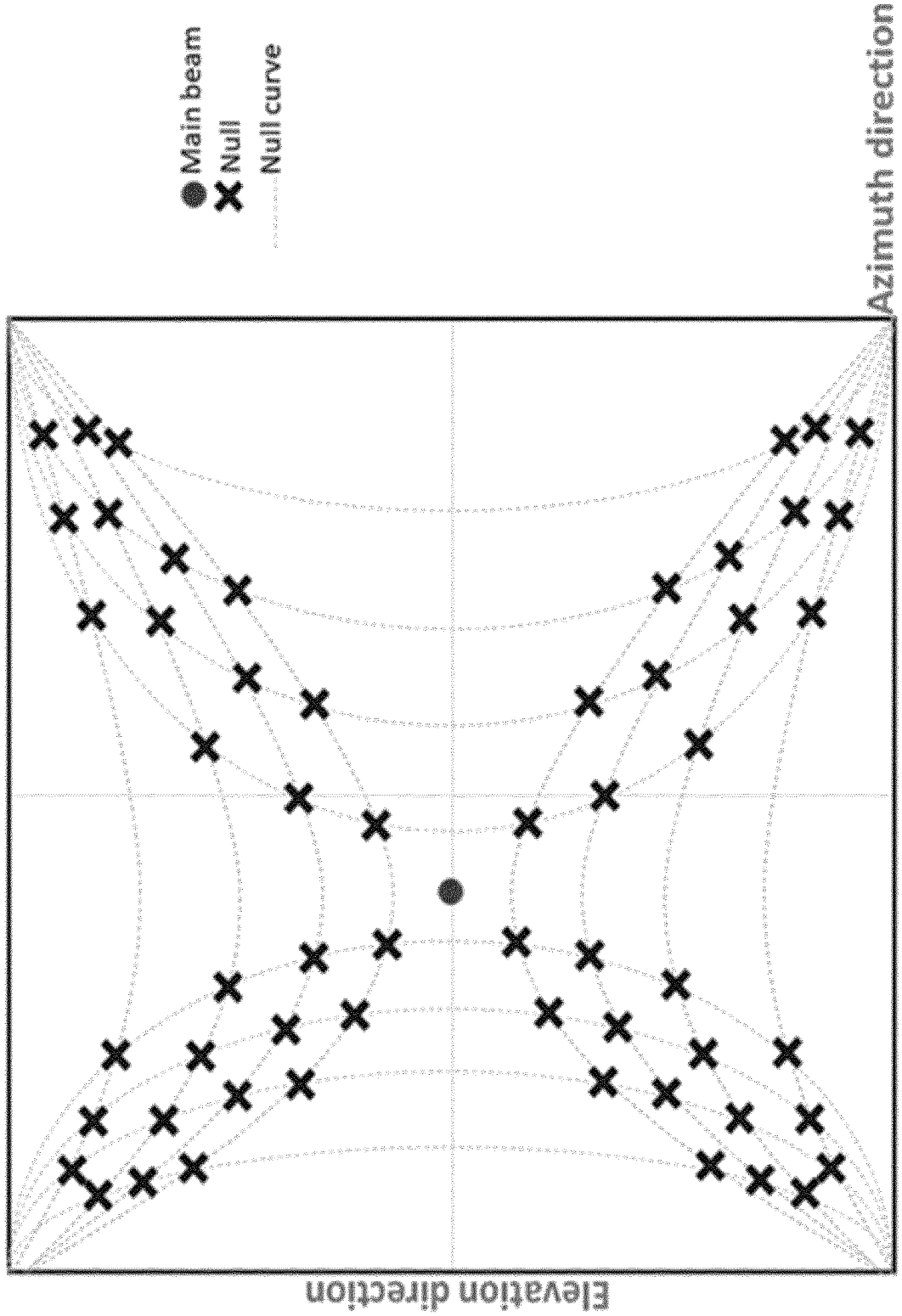
FIGS. 9 through 12 are graphs that show an example of moving null locations in accordance with some embodiments of the present disclosure.
Figure 10:
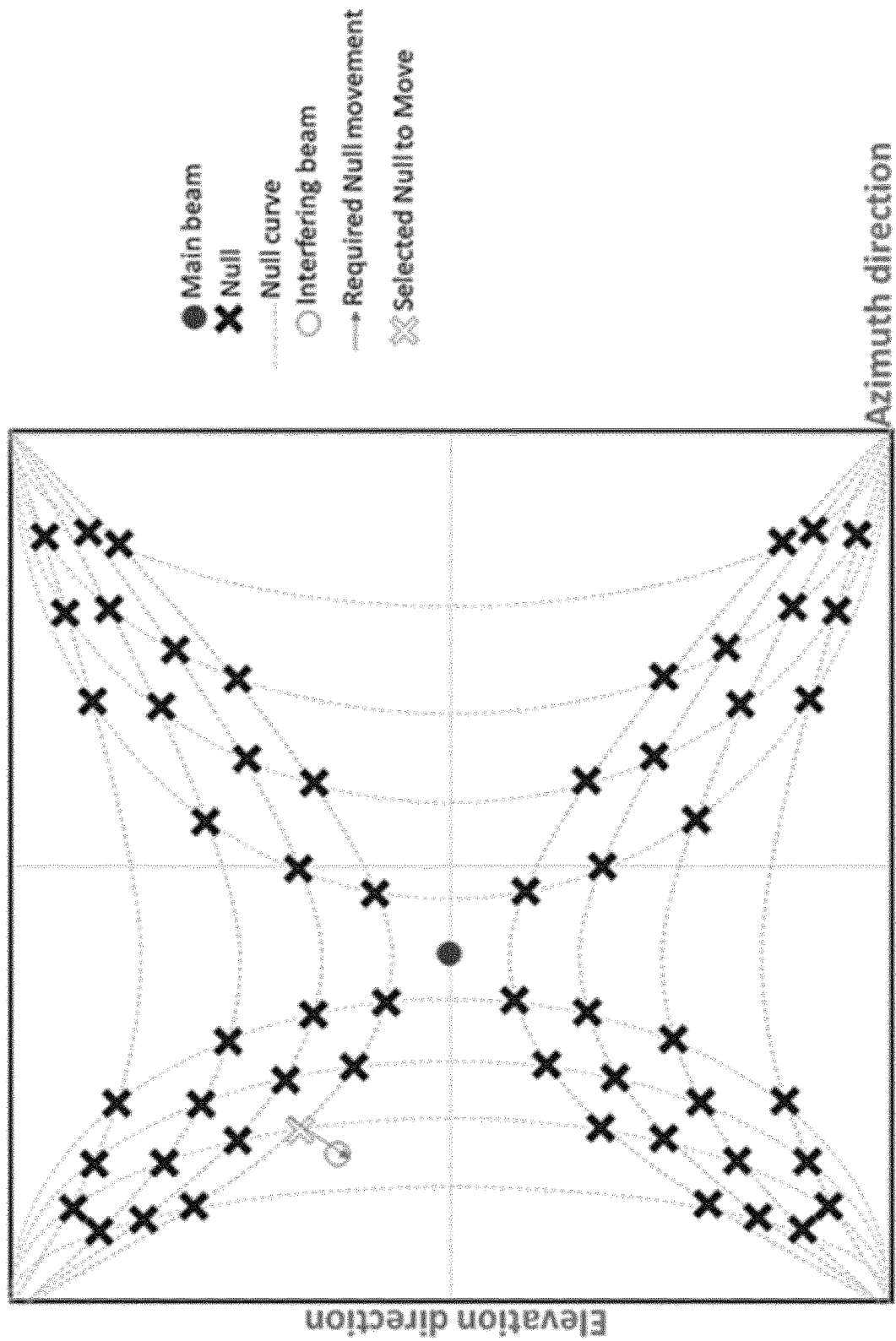
Figure 11:
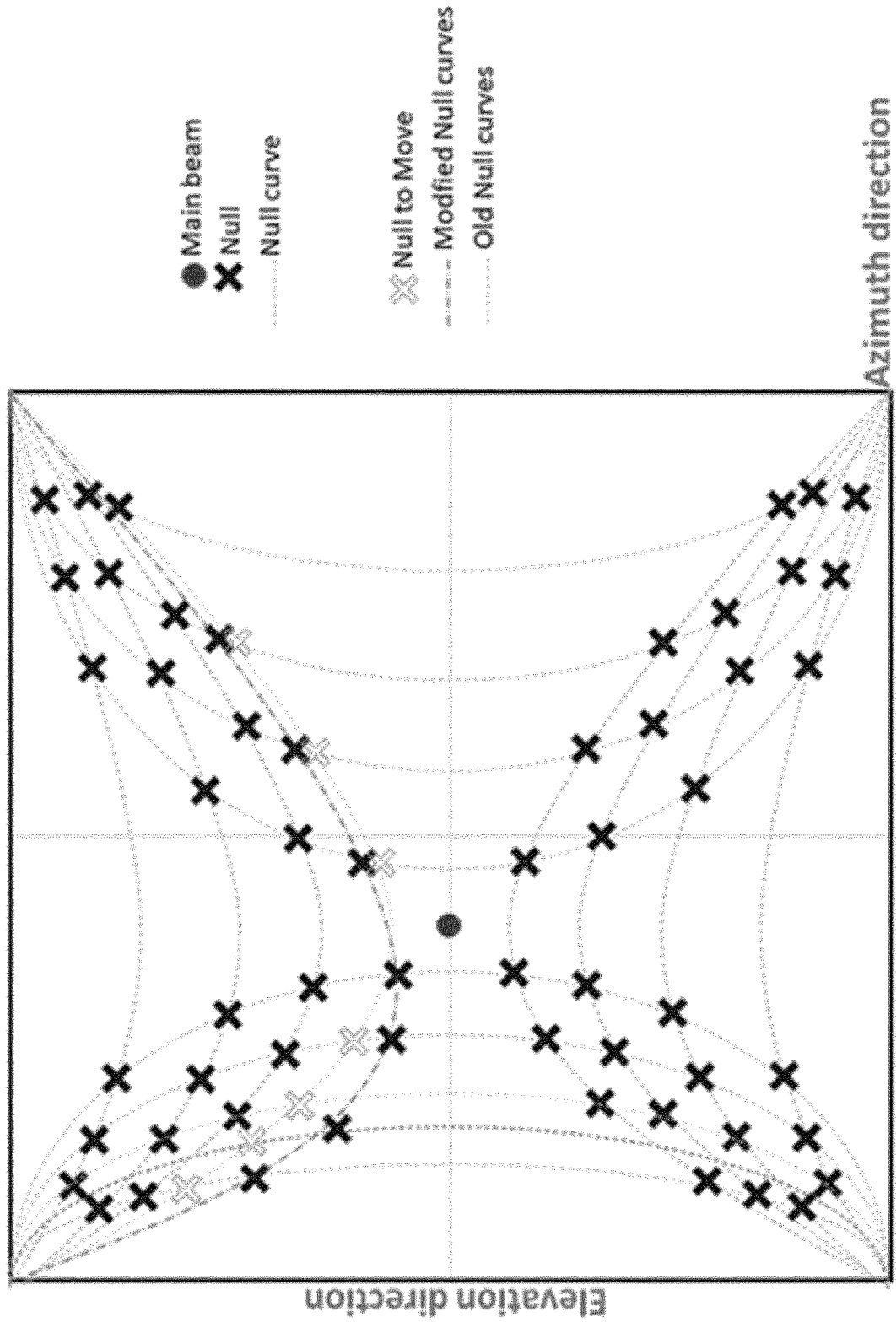
Figure 12:
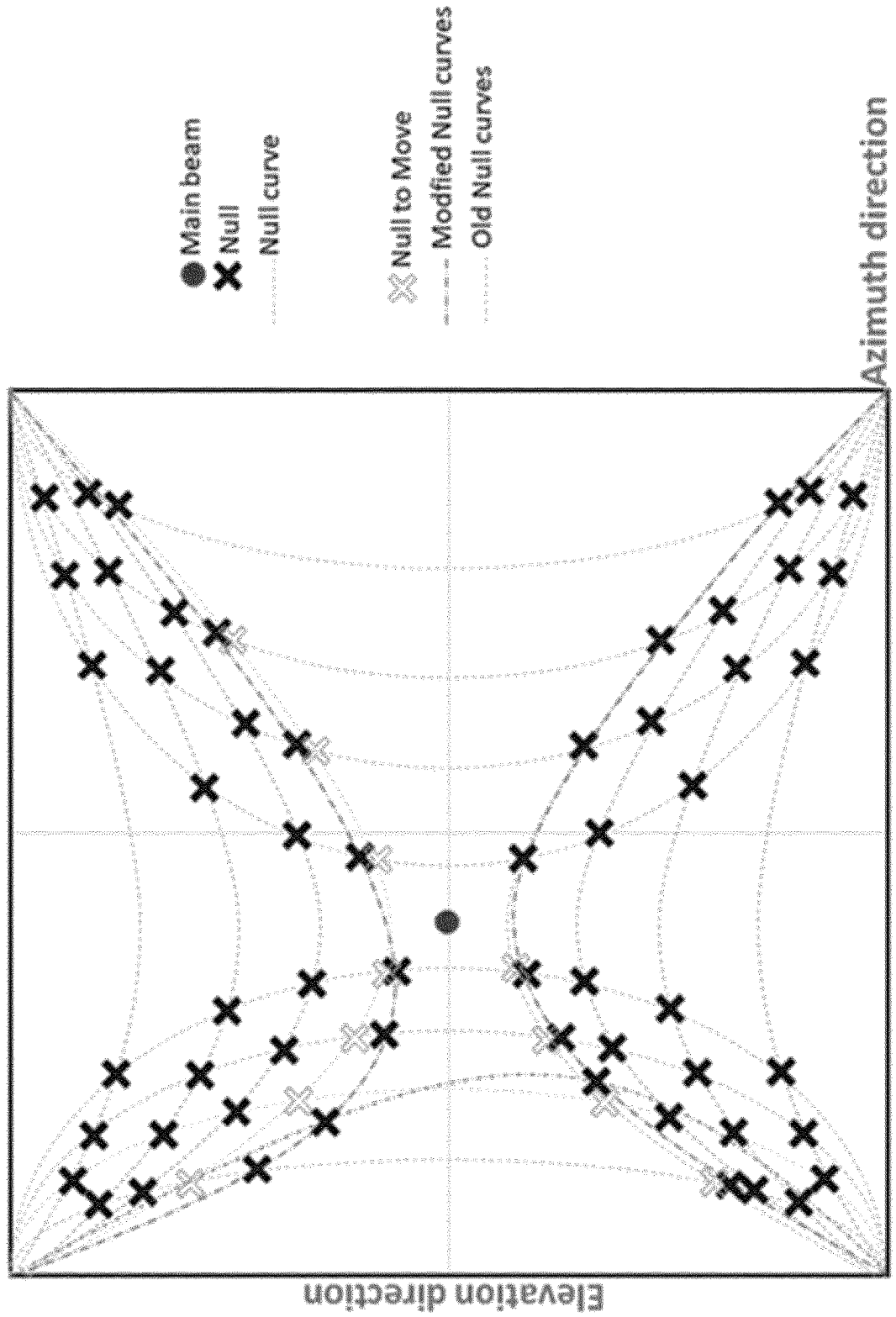

An example of moving the null locations is illustrated in FIGS. 9 through 12. FIG. 9 is a graph that shows a beam and nulls in the azimuth elevation plane for an advanced antenna system. The nulls are lying at the crossing of vertical and horizontal null curves. The azimuth and elevation plane is within −90 to 90 degrees. The null curves are dependent on the number of elements, array factor, and beam weighting factor. For example, if there are eight elements in azimuth direction, there will eight vertical curves. Similarly, eight elevation elements will create eight horizontal curves. The coefficient of the curves are defined by the beam weighting factor for a given array design. FIG. 10 shows an interfering beam in azimuth elevation plane of another beam. The closest null to the interfering beam is found. Then, that selected null is moved to the interfering beam position. But moving only a single null will create discontinuities and distortion in the beam pattern. In order to address this, FIG. 11 shows finding the surrounding (neighboring) nulls of the selected null, and then moving the surrounding nulls with a filtering effect (e.g., a Gaussian filtering or some other types of filtering). As a result, the corresponding null curves are moved to new positions.

A set of new beam weighting factors ($W_{NEW}$) for the particular beam is then computed based on: (A) either SINR if the particular beam is a receive beam for the uplink or known coupling between the AEs in the respective subarray fi the particular beam is a transmit beam for the downlink and (B) the set of new null locations for the particular beam (step 804). More specifically, for the downlink, a first set of equations for solving for a set of correction factors $\{W_{cr}(a, e, u)\}_{e=1,2, \ldots, N}$ is generated based on the known coupling factors between the antenna elements in the respective subarray in accordance with Eqn (14) above, and a second set of equations for solving for the set of correction factors $\{W_{cr}(a, e, u)\}_{e=1,2, \ldots, N}$ is generated based on the set of new null locations in accordance with Eqn (16) above. The first and second sets of equations are then used to solve for set of correction factors $\{W_{cr}(a, e, u)\}_{e=1,2, \ldots, N}$ using any desired numerical technique such as, e.g., the Newton Raphson method [2]. The new set of beam weighting factors ($W_{NEW}$) can then be created by applying the computed correction factors $\{W_{cr}(a, e, u)\}_{e=1,2, \ldots, N}$ to the initial beam weighting factors $\{W(a, e, u)\}_{e=1,2, \ldots, N}$. This can be expressed as $W_{NEW} = \{W(a, e, u) W_{cr}(a, e, u)\}_{e=1,2, \ldots, N}$.

For the uplink, a first set of equations for solving for a set of correction factors $\{W_{cr}(a, e, u)\}_{e=1,2, \ldots, N}$ is generated based on the known SINR between the respective UE and the antenna elements in the respective subarray in accordance with Eqn (15) above, and a second set of equations for solving for the set of correction factors $\{W_{cr}(a, e, u)\}_{e=1,2, \ldots, N}$ is generated based on the set of new null locations in accordance with Eqn (16) above. The first and second sets of equations are then used to solve for set of correction factors $\{W_{cr}(a, e, u)\}_{e=1,2, \ldots, N}$ using any desired numerical technique such as, e.g., the Newton Raphson method [2]. The new set of beam weighting factors ($W_{NEW}$) can then be created by applying the computed correction factors $\{W_{cr}(a, e, u)\}_{e=1,2, \ldots, N}$ to the initial beam weighting factors $\{W(a, e, u)\}_{e=1,2, \ldots, N}$. This can be expressed as $W_{NEW} = \{W(a, e, u) W_{cr}(a, e, u)\}_{e=1,2, \ldots, N}$.

The new beam weighting factors are then utilized for receiving (uplink) or transmitting (downlink) on the particular beam (step 806).

Figure 13:
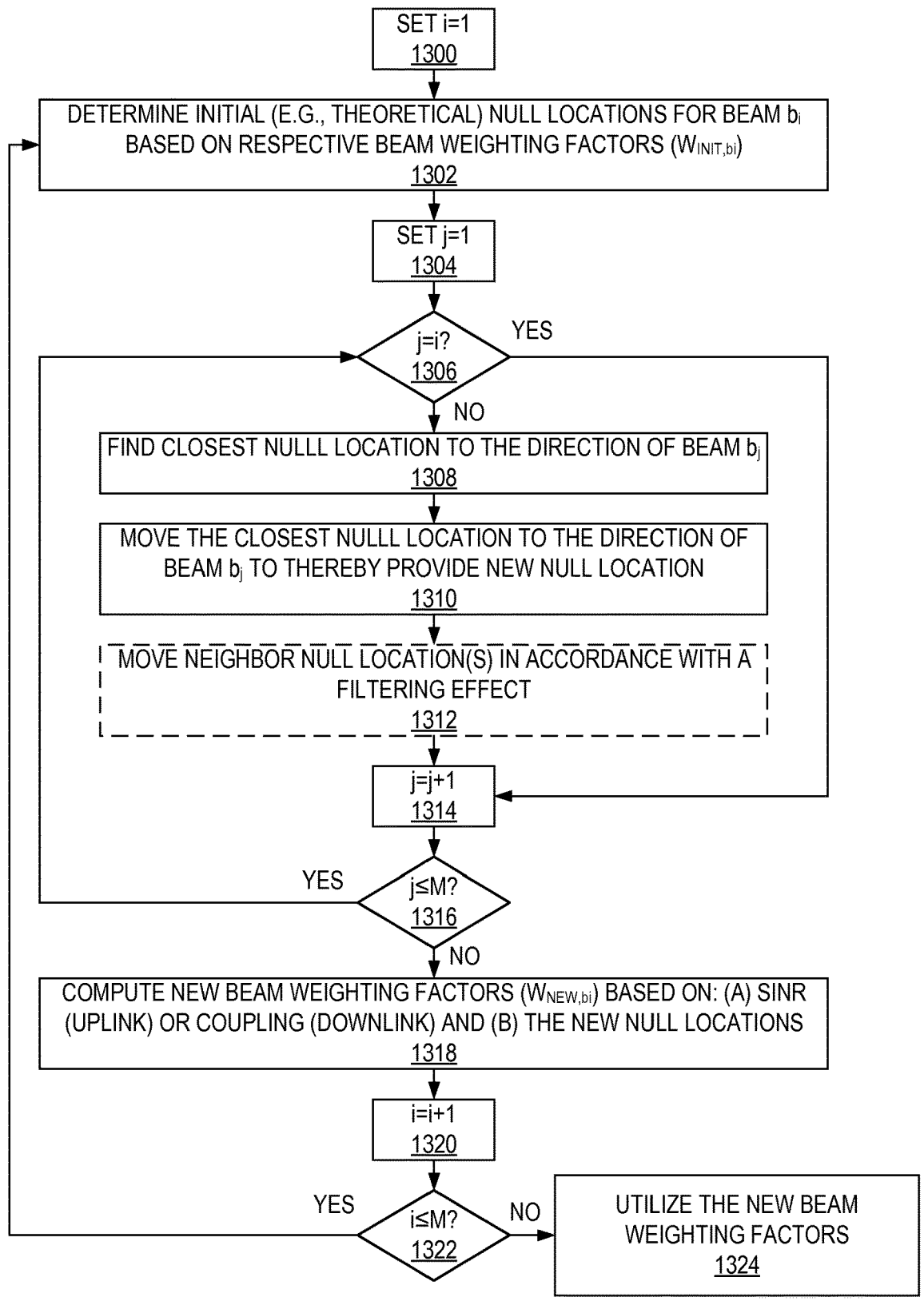
FIG. 13 is a flow chart that illustrates a forced-orthogonality procedure for computing beam weighting factors in accordance with some other embodiments of the present disclosure.

FIG. 13 is a flow chart that illustrates a more detailed version of a forced-orthogonality procedure in accordance with some embodiments of the present disclosure. The process beings with knowledge of a set of beams $\{b_i\}_{i=1,2, \ldots, M}$ to be used simultaneously (i.e., using the same time and frequency resources). For instance, the set of beams $\{b_i\}_{i=1, 2, \ldots, M}$ may be a set of beams directed at a number (M) of scheduled UEs for particular transmission time interval in a MU-MIMO system. To begin the process for a first beam in the set of beams $\{b_i\}_{i=1,2, \ldots, M}$, an index i is initialized to a value of 1 (step 1300). A set of initial null locations for beam $b_i$ is determined based on a respective set of bean weighting factors, denoted here as W (step 1302). Using the nomenclature from above, beam $b_i$ is for a particular UE, and the set of initial beam weighting factors for beam $b_i$ can be expressed as the set of N beam weighting factors $\{W(a, e, u)\}_{e=1,2, \ldots, N}$ for a given value of a that corresponds to the subarray used to form beam $b_i$ and a given value of u that corresponds to the particular UE at which beam $b_i$ is directed. The initial null locations can be computed from the initial beam weighting factors, as will be appreciated by one of skill in the art.

One or more of the initial null locations for beam $b_i$ are then changed based on the beam directions (i.e., the direction of the main lobes) of the other beams $\{b_j\}_{j \neq i}$ in the set of beams $\{b_i\}_{i=1,2, \ldots, M}$. More specifically, a counter j is initialized to a value of 1 (step 1304). Then, if j=i (step 1306, YES), the process proceeds to step 1314. Otherwise, if j≠i (step 1306, NO), the initial null location for beam $b_i$ that is closest to the beam direction of the other beam $b_j$ is identified (step 1308). The identified initial null locations is then moved to the beam direction of beam $b_j$ to thereby provide a new null location for beam $b_i$ (step 1310). In other words, within the set of new null locations for beam $b_i$, the identified (closest) initial location to the beam direction of beam $b_j$ is replaced with a new null location at the beam direction of beam $b_j$. Optionally (as indicated by the dashed box), one or more neighboring initial null locations (i.e., one or more initial null locations that are near the identified initial null location) are replaced with new null locations in accordance with a filtering effect (step 1312). For example, the filtering effect may be a Gaussian filtering effect such that the one or more neighboring initial null locations are replaced with new null locations at values (i.e., directions) equal to a Gaussian distribution. In other words, some of the neighboring null locations are also changed, but the delta position (i.e., the change in position of the null) is Gaussian compared to the main null movement.

The index j is then incremented (step 1314). If j≤M (step 1316, YES), then the process returns to step 1306 and is repeated to identify and move the initial null that is closest to the next other beam $b_j$. Once all of the other beams have been processed (step 1316, NO), a new set of beam weighting factors for beam $b_i$, denoted here as $W_{NEW,bi}$, is computed based on (A) SINR (uplink) or coupling (downlink) and (B) the set of new null locations for beam $b_i$ (step 1318).

The index i is then incremented (step 1320). If i≤M (step 1322, YES), then the process returns to step 1302 and is repeated to compute new beam weighting factors for the next beam $b_i$. Once all of the beams have been processed (step 1322, NO), the new beam weighting factors for the beams are utilized for transmission (downlink) or reception (uplink) (step 1324).

Figure 14:
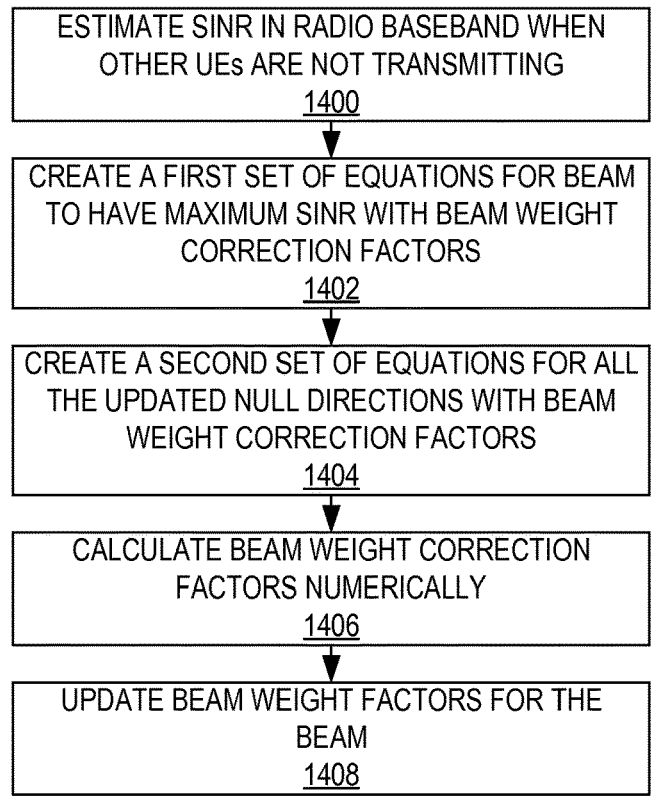
FIG. 14 is a flow chart that illustrates a process for computing the new beam weighting factors for a beam used for uplink reception based on the new set of null locations in accordance with some embodiments of the present disclosure.

FIG. 14 is a flow chart that illustrates a process for computing the new beam weighting factors for a beam used for uplink reception based on the new set of null locations in accordance with some embodiments of the present disclosure. The process of FIG. 14 can be seen as a more detailed version of step 804 of FIG. 8 and step 1318 of FIG. 13. As illustrated, a SINR between the UE associated with a particular beam, referred to here as in FIG. 13 as beam $b_i$, is estimated (step 1400). This estimation is performed while none of the other UEs are transmitting. A first set of equations is created for the particular beam to have maximum SINR with beam weight correction factors $\{W_{cr}(a, e, u)\}_{e=1,2,\ldots,N}$ for a given value of a that corresponds to the subarray used to form beam $b_i$ and a given value of u that corresponds to the particular UE associated with beam $b_i$ (step 1402). In the example embodiments described herein, the first set of equations are created in accordance with Eqn (15) above. In addition, a second set of equations is created for the set of new null locations with the same beam weight correction factors $\{W_{cr}(a, e, u)\}_{e=1,2,\ldots,N}$ (step 1404). In the example embodiments described herein, the second set of equations are crated in accordance with Eqn (16) above.

The first and second set of equations together form a system of equations that are then solved using a numerical method to compute values for the beam weight correction factors $\{W_{cr}(a, e, u)\}_{e=1,2,\ldots,N}$ (step 1406). The initial set of beam weight factors $\{W(a, e, u)\}_{e=1,2,\ldots,N}$ for beam $b_i$ are then updated with the beam weight correction factors $\{W_{cr}(a, e, u)\}_{e=1,2,\ldots,N}$ to provide the new beam weight correction factors $\{W(a, e, u)W_{cr}(a, e, u)\}_{e=1,2,\ldots,N}$ for beam $b_i$ (step 1408).

Figure 15:
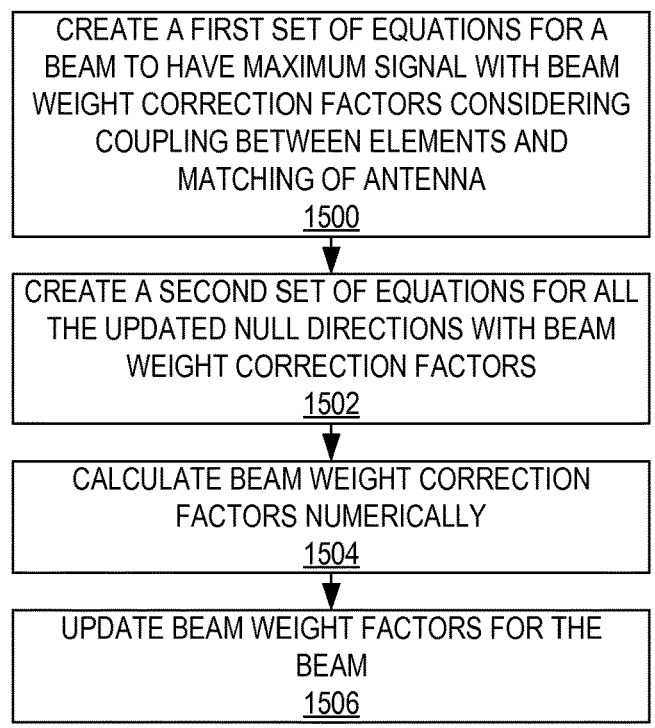
FIG. 15 is a flow chart that illustrates a process for computing the new beam weighting factors for a beam used for downlink transmission based on the new set of null locations in accordance with some embodiments of the present disclosure.

FIG. 15 is a flow chart that illustrates a process for computing the new beam weighting factors for a beam used for downlink transmission based on the new set of null locations in accordance with some embodiments of the present disclosure. The process of FIG. 15 can be seen as a more detailed version of step 804 of FIG. 8 and step 1318 of FIG. 13. As illustrated, a first set of equations is created for a particular beam, denoted here as in FIG. 13 as beam $b_i$, to have maximum signal strength with beam weight correction factors $\{W_{cr}(a, e, u)\}_{e=1,2,\ldots,N}$ for a given value of a that corresponds to the subarray used to form beam $b_i$ and a given value of u that corresponds to the particular UE associated with beam $b_i$ considering the known coupling between AEs and antenna matching (step 1500). In the example embodiments described herein, the first set of equations are created in accordance with Eqn (14) above. In addition, a second set of equations is created for the set of new null locations with the same beam weight correction factors $\{W_{cr}(a, e, u)\}_{e=1,2,\ldots,N}$ (step 1502). In the example embodiments described herein, the second set of equations are crated in accordance with Eqn (16) above.

The first and second set of equations together form a system of equations that are then solved using a numerical method to compute values for the beam weight correction factors $\{W_{cr}(a, e, u)\}_{e=1,2,\ldots,N}$ (step 1504). The initial set of beam weight factors $\{W(a, e, u)\}_{e=1,2,\ldots,N}$ for beam $b_i$ are then updated with the beam weight correction factors $\{W_{cr}(a, e, u)\}_{e=1,2,\ldots,N}$ to provide the new beam weight correction factors $\{W(a, e, u)W_{cr}(a, e, u)\}_{e=1,2,\ldots,N}$ for beam $b_i$ (step 1506).

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include DSPs, special-purpose digital logic, and the like. The processing circuitry may be configured to execute program code stored in memory, which may include one or several types of memory such as ROM, RAM, cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
AP Access Point
ASIC Application Specific Integrated Circuit
BSC Base Station Controller
BTS Base Transceiver Station
CD Compact Disk
COTS Commercial Off-the-Shelf
CPE Customer Premise Equipment
CPU Central Processing Unit
D2D Device-to-Device
DAS Distributed Antenna System
DSP Digital Signal Processor
DVD Digital Video Disk
eNB Enhanced or Evolved Node B
E-SMLC Evolved Serving Mobile Location Center
GHz Gigahertz
gNB New Radio Base Station
GSM Global System for Mobile Communications IoT Internet of Things
IP Internet Protocol
LEE Laptop Embedded Equipment
LME Laptop Mounted Equipment
LTE Long Term Evolution
M2M Machine-to-Machine
MANO Management and Orchestration
MCE Multi-Cell/Multicast Coordination Entity
MDT Minimization of Drive Tests
MIMO Multiple Input Multiple Output
MME Mobility Management Entity
MSC Mobile Switching Center
MSR Multi-Standard Radio
MTC Machine Type Communication
NB-IoT Narrowband Internet of Things
NFV Network Function Virtualization
NIC Network Interface Controller
NR New Radio
O&M Operation and Maintenance
OSS Operations Support System
OTT Over-the-Top
PDA Personal Digital Assistant
P-GW Packet Data Network Gateway
RAM Random Access Memory
RAN Radio Access Network
RAT Radio Access Technology
RF Radio Frequency
RNC Radio Network Controller
ROM Read Only Memory
RRH Remote Radio Head
RRU Remote Radio Unit
SCEF Service Capability Exposure Function
SOC System on a Chip
SON Self-Organizing Network
UE User Equipment
USB Universal Serial Bus
$V_2I$ Vehicle-to-Infrastructure
V2V Vehicle-to-Vehicle
V2X Vehicle-to-Everything
VMM Virtual Machine Monitor
VNE Virtual Network Element
VNF Virtual Network Function
VoIP Voice over Internet Protocol
WCDMA Wideband Code Division Multiple Access
WiMax Worldwide Interoperability for Microwave Access Those skilled in the art will recognize improvements and modifications to the embodiments of the present disclosure. All such improvements and modifications are considered within the scope of the concepts disclosed herein.

The invention claimed is:

1. A radio system, comprising:
an antenna system comprising:
 a plurality of antenna elements; and
  (a) a plurality of transmit branches coupled to the plurality of antenna elements, respectively, or
  (b) a plurality of receive branches coupled to the plurality of antenna elements, respectively, or
  (c) both the plurality of transmit branches and the plurality of receive branches respectively coupled to the plurality of antenna elements; and
a processing unit associated with the antenna system, the processing unit being adapted to:
 determine an initial set of null locations for a first transmit or receive beam;
 change one or more null locations in the initial set of null locations for the first transmit or receive beam based on a second transmit or receive beam to be used simultaneously with the first transmit or receive beam, thereby providing a new set of null locations for the first transmit or receive beam, wherein, in order to change the one or more null locations in the initial set of null locations to thereby provide the new set of null locations, the processing unit is further adapted to:
  find an initial null location from the initial set of null locations that is closest to a beam direction of the second transmit or receive beam;
  change the initial null location to a new null location that is based on the beam direction of the second transmit or receive beam; and
  change an additional initial null location from the initial set of null locations;
 transmit or receive the first transmit or receive beam based on the new set of null locations for the first transmit or receive beam.

2. The radio system of claim 1 wherein the radio system is part of a base station for a cellular communications network.

3. The radio system of claim 2 wherein the first transmit or receive beam and the second transmit or receive beam are transmit beams for simultaneous downlink transmissions to respective wireless devices.

4. The radio system of claim 3 wherein the processing unit is further adapted to compute a new set of beam weighting factors for the first transmit beam based on the new set of null locations for the first transmit beam and known coupling factors between antenna elements in at least a subset of the plurality of antenna elements utilized to transmit on the first transmit beam and antenna elements in at least a subset of the plurality of antenna elements utilized to transmit on the second transmit beam.

5. The radio system of claim 4 wherein, in order to compute the new set of beam weighting factors for the first transmit beam, the processing unit is further adapted to:
generate a first set of equations to solve for beam weight correction factors for the first transmit beam, the first set of equations being based on the first transmit beam having maximum signal with the beam weight correction factors considering known coupling factors between antenna elements in the at least a subset of the plurality of antenna elements utilized to transmit on the first transmit beam and antenna elements in the at least a subset of the plurality of antenna elements utilized to transmit on the second transmit beam;
generate a second set of equations to solve for the beam weight correction factors, the second set of equations being based on the new set of null locations;
calculate the beam weight correction factors using a numerical method based on the first set of equations and the second set of equations; and
apply the beam weight correction factors to the initial set of beam weighting factors for the first transmit beam to thereby provide the new set of beam weighting factors for the first transmit beam.

6. The radio system of claim 1 wherein the first transmit or receive beam and the second transmit or receive beam are receive beams for reception of simultaneous uplink transmissions from respective wireless devices.

7. The radio system of claim 6 wherein the processing unit is further adapted to compute a new set of beam weighting factors for the first receive beam based on the new set of null locations for the first receive beam and a known Signal to Interference plus Noise Ratio, SINR, for the respective wireless device associated with the first receive beam.

8. The radio system of claim 7 wherein, in order to compute the new set of beam weighting factors for the first receive beam, the processing unit is further adapted to:
generate a first set of equations to solve for beam weight correction factors for the first receive beam, the first set of equations being based on the first receive beam having maximum Signal to Interference plus Noise Ratio, SINR, with the beam weight correction factors;
generate a second set of equations to solve for the beam weight correction factors, the second set of equations being based on the new set of null locations;
calculate the beam weight correction factors using a numerical method based on the first set of equations and the second set of equations; and
apply the beam weight correction factors to the initial set of beam weighting factors for the first receive beam to thereby provide the new set of beam weighting factors for the first receive beam.

9. A method in a radio system comprising:
an antenna system comprising:
a plurality of antenna elements, and:
(a) a plurality of transmit branches coupled to the plurality of antenna elements, respectively, or
(b) a plurality of receive branches coupled to the plurality of antenna elements, respectively, or
(c) both the plurality of transmit branches and the plurality of receive branches respectively coupled to the plurality of antenna elements;
wherein the method comprises:
determining an initial set of null locations for a first transmit or receive beam;
changing one or more null locations in the initial set of null locations for the first transmit or receive beam based on a second transmit or receive beam to be used simultaneously with the first transmit or receive beam, thereby providing a new set of null locations for the first transmit or receive beam, wherein changing the one or more null locations in the initial set of null locations to thereby provide the new set of null locations comprises:
finding an initial null location from the initial set of null locations that is closest to a beam direction of the second transmit or receive beam;
changing the initial null location to a new null location that is based on the beam direction of the second transmit or receive beam; and
changing an additional initial null location from the initial set of null locations;
transmitting or receiving the first transmit or receive beam based on the new set of null locations for the first transmit or receive beam.

10. The method of claim 9 wherein the radio system is part of a base station for a cellular communications network.

11. The method of claim 10 wherein the first transmit or receive beam and the second transmit or receive beam are transmit beams for simultaneous downlink transmissions to respective wireless devices.

12. The method of claim 11 wherein computing the new set of beam weighting factors comprises computing a new set of beam weighting factors for the first transmit beam based on the new set of null locations for the first transmit beam and known coupling factors between antenna elements in at least a subset of the plurality of antenna elements utilized to transmit on the first transmit beam and antenna elements in at least a subset of the plurality of antenna elements utilized to transmit on the second transmit beam.

13. The method of claim 12 wherein computing the new set of beam weighting factors for the first transmit beam comprises:
generating a first set of equations to solve for beam weight correction factors for the first transmit beam, the first set of equations being based on the first transmit beam having maximum signal with the beam weight correction factor considering known coupling factors between antenna elements in the at least a subset of the plurality of antenna elements utilized to transmit on the first transmit beam and antenna elements in the at least a subset of the plurality of antenna elements utilized to transmit on the second transmit beam;
generating a second set of equations to solve for the beam weight correction factors, the second set of equations being based on the new set of null locations;
calculating the beam weight correction factors using a numerical method based on the first set of equations and the second set of equations; and
applying the beam weight correction factors to the initial set of beam weighting factors for the first transmit beam to thereby provide the new set of beam weighting factors for the first transmit beam.

14. The method of claim 10 wherein the first transmit or receive beam and the second transmit or receive beam are receive beams for reception of simultaneous uplink transmissions from respective wireless devices.

15. The method of claim 14 wherein computing a new set of beam weighting factors for the first receive beam comprises computing the new set of beam weighting factors for the first receive beam based on the new set of null locations for the first receive beam and a known Signal to Interference plus Noise Ratio, SINR, for the respective wireless device associated with the first receive beam.

16. The method of claim 15 wherein computing the new set of beam weighting factors for the first receive beam comprises:
generating a first set of equations to solve for beam weight correction factors for the first receive beam, the first set of equations being based on the first receive beam having maximum Signal to Interference plus Noise Ratio, SINR, with the beam weight correction factors;
generating a second set of equations to solve for the beam weight correction factors, the second set of equations being based on the new set of null locations;
calculating the beam weight correction factors using a numerical method based on the first set of equations and the second set of equations; and
applying the beam weight correction factors to the initial set of beam weighting factors for the first receive beam to thereby provide the new set of beam weighting factors for the first receive beam.

\* \* \* \* \*